United States Patent [19]
Kaneko et al.

[11] Patent Number: 5,230,628
[45] Date of Patent: Jul. 27, 1993

[54] APPARATUS FOR PRODUCING OPERATIONAL MANUAL

[75] Inventors: Takashi Kaneko, Machida; Tsuyoshi Tanaka, Yokohama; Nobuhiko Nagata, Tokyo, all of Japan

[73] Assignee: Ricoh Company, Ltd., Tokyo, Japan

[21] Appl. No.: 711,316

[22] Filed: Jun. 6, 1991

[30] Foreign Application Priority Data

| | | | |
|---|---|---|---|
| Jun. 11, 1990 | [JP] | Japan | 2-152300 |
| Jun. 26, 1990 | [JP] | Japan | 2-169435 |
| Jul. 4, 1990 | [JP] | Japan | 2-178390 |

[51] Int. Cl.$^5$ .......................................... G09B 19/00
[52] U.S. Cl. ........................... 434/118; 434/219; 434/227; 379/100; 358/400
[58] Field of Search ............... 434/118, 219, 227; 364/400, 401, 419, 521; 395/927; 379/100; 358/400, 402, 404, 406, 468

[56] References Cited

U.S. PATENT DOCUMENTS

| | | | |
|---|---|---|---|
| 4,466,798 | 8/1984 | Conroy | 434/118 |
| 4,802,229 | 1/1989 | Yamada | 358/406 |
| 4,893,333 | 1/1990 | Baran et al. | 379/100 |
| 4,941,829 | 7/1990 | Estes et al. | 434/118 |
| 4,964,007 | 10/1990 | Eisen et al. | 434/118 |
| 5,018,082 | 5/1991 | Obata et al. | 434/118 |
| 5,058,008 | 10/1991 | Schumacher | 434/118 |
| 5,105,220 | 4/1992 | Knodt et al. | 434/227 |

FOREIGN PATENT DOCUMENTS

| | | | |
|---|---|---|---|
| 61-243518 | 10/1986 | Japan | |
| 62-262120 | 11/1987 | Japan | |
| 63-66623 | 3/1988 | Japan | |
| 1-280821 | 11/1989 | Japan | |
| 2204176 | 11/1988 | United Kingdom | 434/219 |

Primary Examiner—Jessica J. Harrison
Attorney, Agent, or Firm—Mason, Fenwick & Lawrence

[57] ABSTRACT

An apparatus produces an operational manual of a certain machine and supplies the same to an operator of the machine. The operational manual teaches how to operate a minimum procedure in order to obtain one of functions with which the machine is equipped. Each of the functions including the plurality of minimum procedures which can no longer be segmented. The apparatus stores a help information item for every minimum procedure. Each help information item indicates how to operate a corresponding minimum procedure. The apparatus further stores operations input to the machine by the operator. Thus, the operator analyzes the operations and detects a predetermined function desired by the operator. Then, the apparatus produces the operational manual containing help information items corresponding to the predetermined function, and supplies it to the operator. The operational manual is produced if the apparatus has judged that the predetermined condition has been established.

37 Claims, 29 Drawing Sheets

FIG. 11

EXECUTE FOLLOWING PROCEDURE
— 50

1. SET MANUSCRIPT IN FAX.

2. TELEPHONE MAIL CENTER.  [7][7][7]  [8][1][1]

3. ENTER KEY AFTER VOICE GUIDANCE
   "THIS IS MAIL CENTER. WE ARE
   STARTING ACCEPTANCE."

[1][2][3][4][5][6][7][8][#]   YOUR ID
   [0][0][0][0][2][#]            SERVICE CODE

4. ENTER CALLING TEL. NO. AND [#][#]

[0][3][1][4][3][0][#]         TIME
   [ ][ ][ ][ ][ ][#]            TEL NO.
   [ ]

5. PRESS START BUTTON.          [START]

6. PLACE RECEIVER ON HOOK.

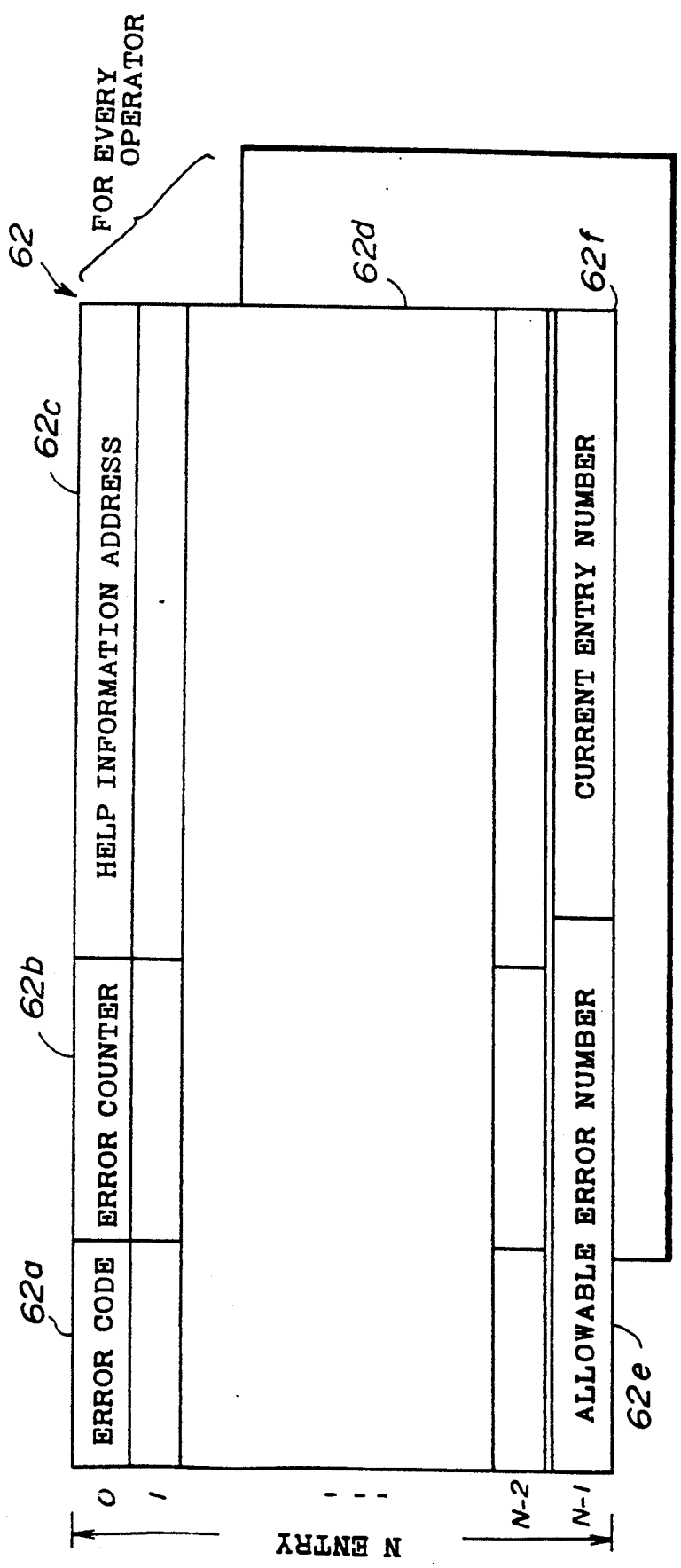

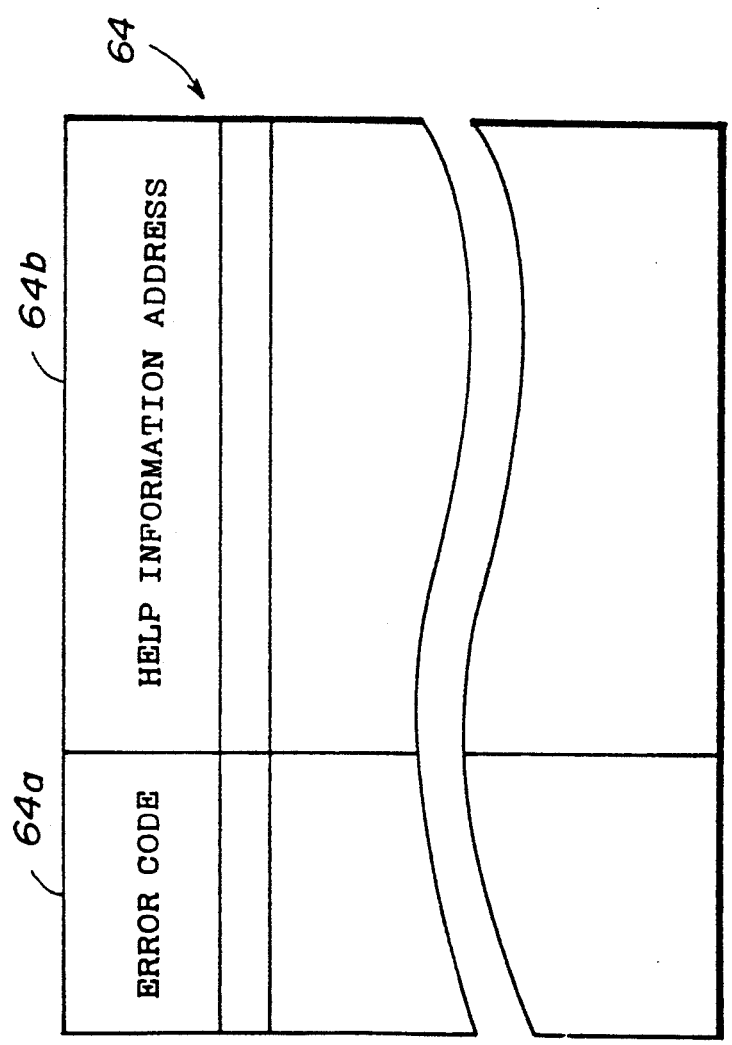

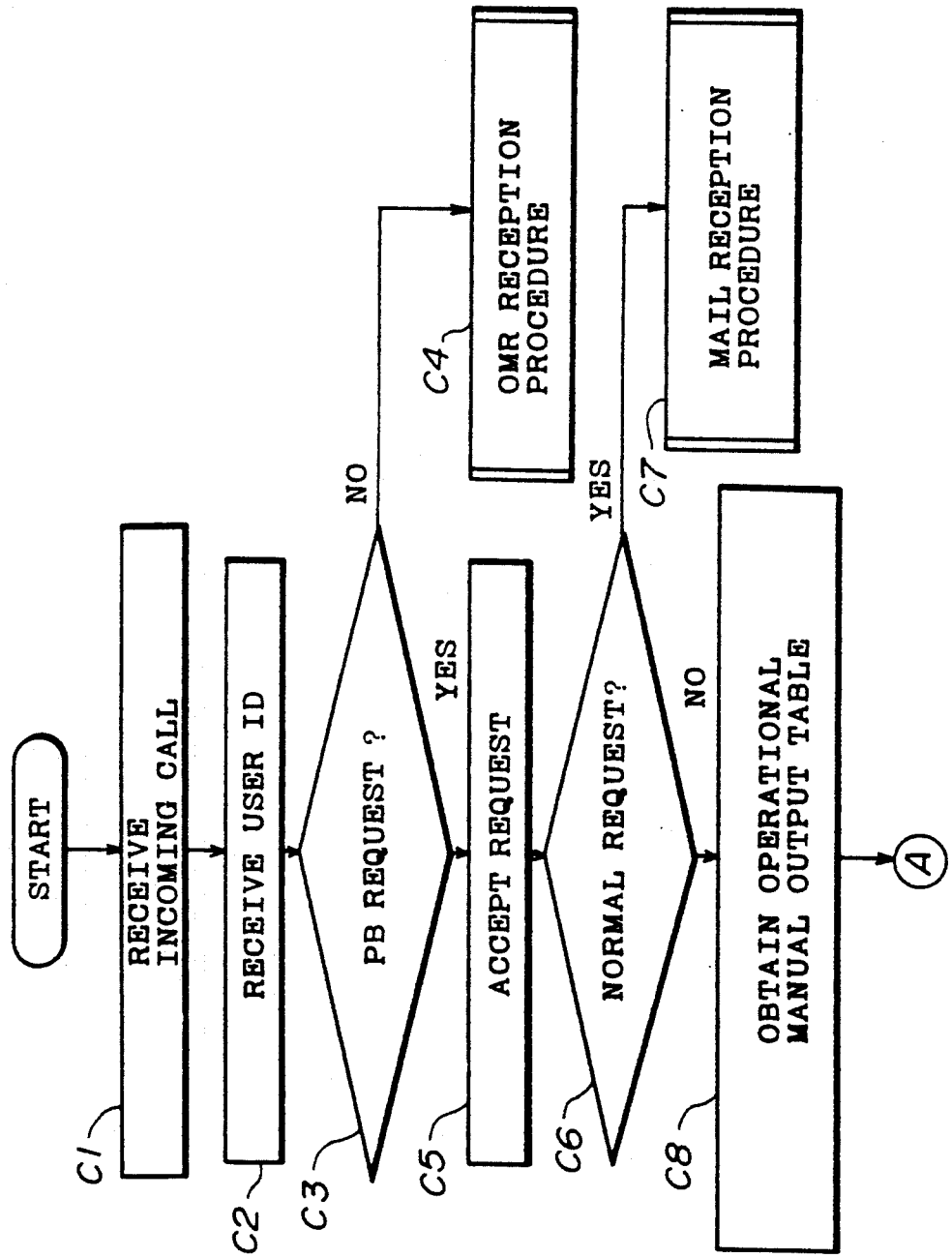

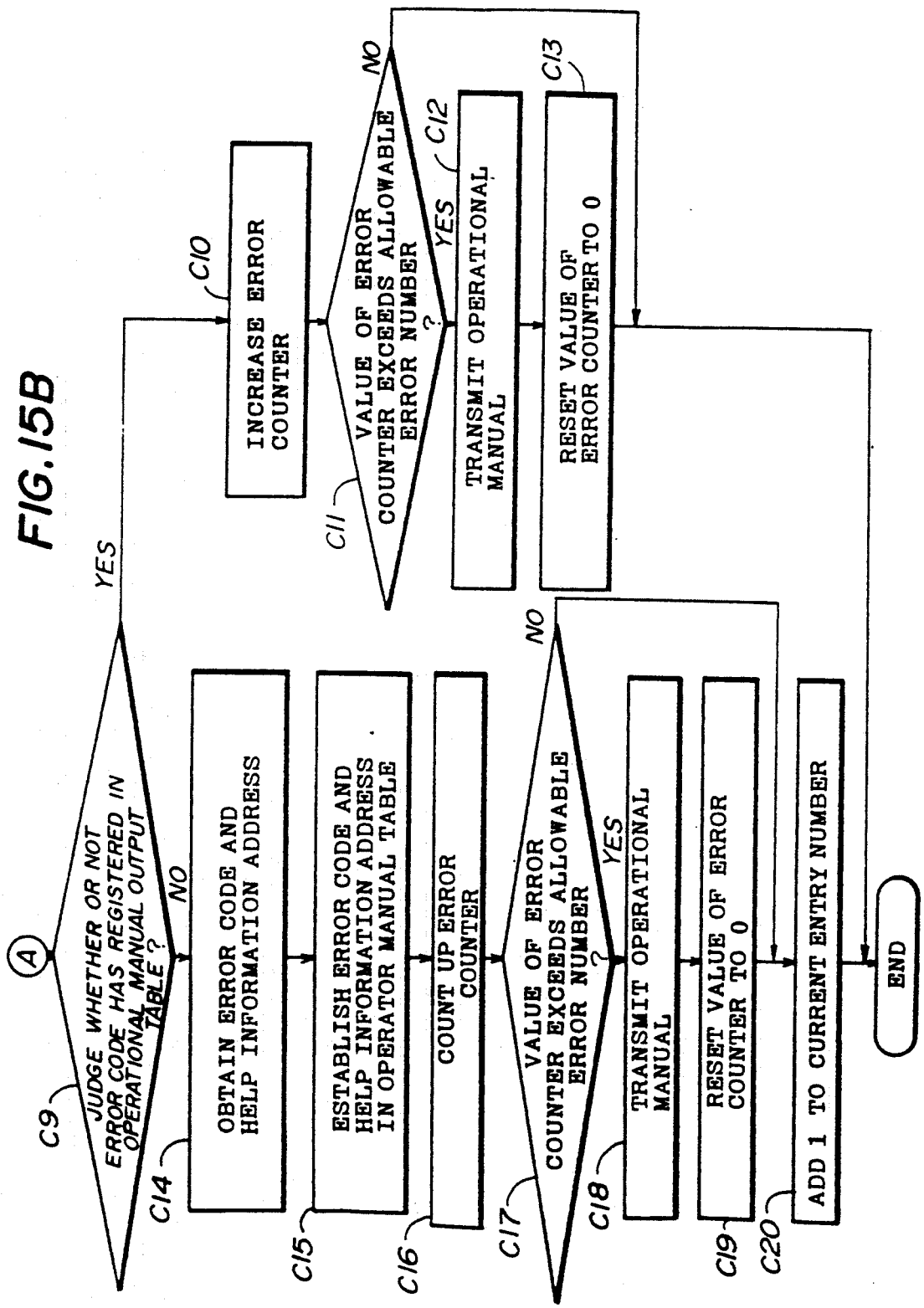

FIG.17

| MINIMUM PROCEDURE CODE (72a) | FREQUENCY IN USE (72b) |
|---|---|
| | |

{ FOR EVERY OPERATOR } → 72

FIG.18

| MINIMUM PROCEDURE CODE (74a) | HELP INFORMATION ADDRESS (74b) | TIME-OUT PERIOD (74c) |
|---|---|---|
| | | |

→ 74

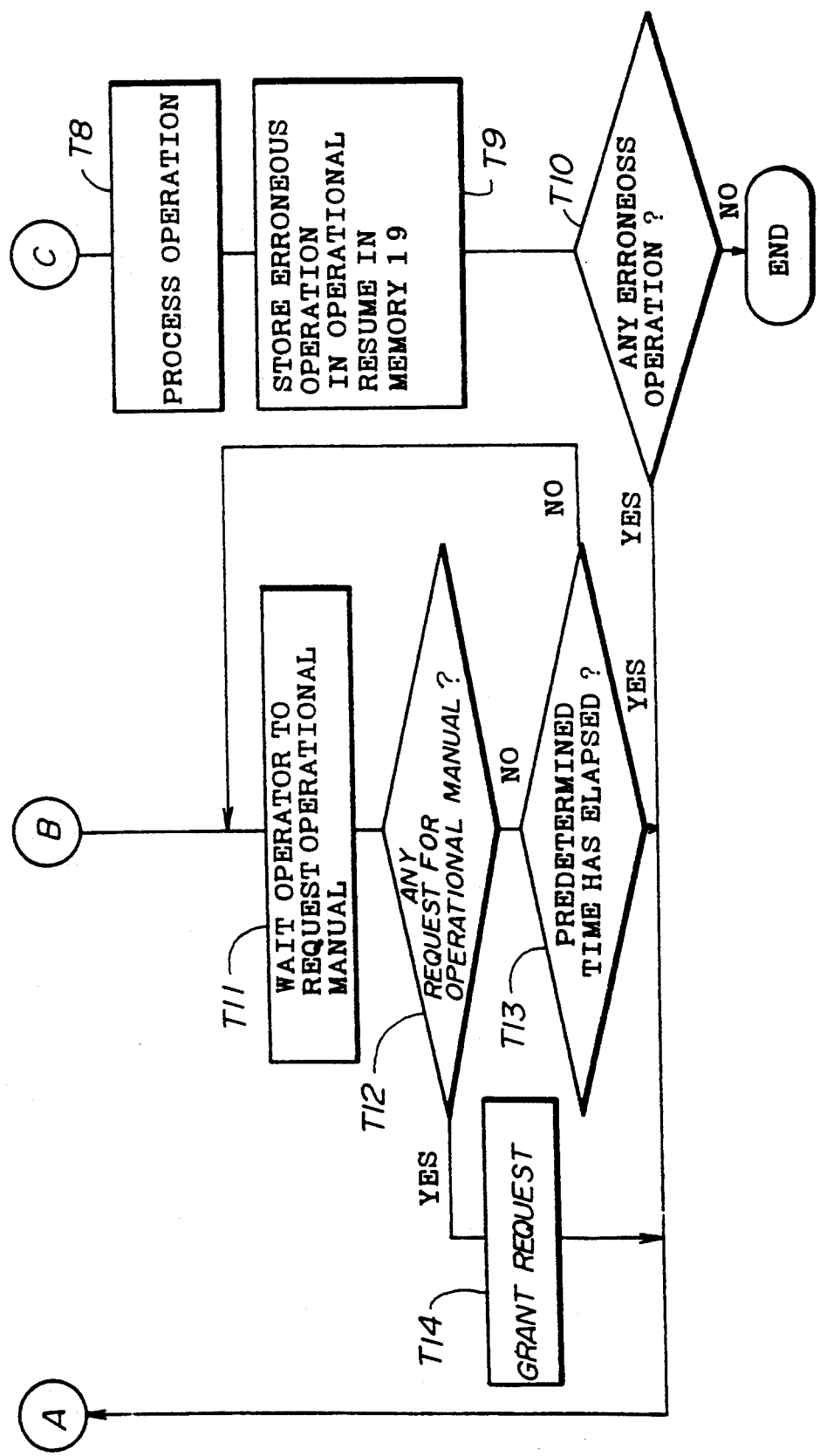

FIG. 21A

```
x  x  x  x  x  x  x  x  x  x  x
x  ERRORNEOUS OPERATION INFORMATION  x
x  x  x  x  x  x  x  x  x  x
              x             x
ID CODE OF    x    x THAT YOU HAVE ENTERED

HAS NOT BEEN REGISTERED YET.

REENTER CORRECT ID CODE, PLEASE.
```

FIG. 21B

```
x x x x x x x x x x x x x
x  ERRORNEOUS OPERATION INFORMATION x
x x x x x x x x x x x x
ID CODE OF    x 1 2 3 x   THAT YOU HAVE ENTERED
              x     x

HAS NOT BEEN REGISTERED YET.

REENTER CORRECT ID CODE, PLEASE.
```

FIG.25

```
x x x x x x x x x
x   ENTRY ERROR INFORMATION   x
x   x x x x x   x x x

ERROR IN USER ID

SHORTAGE OF NUMBER OF FIGURE.
CONFIRM YOUR USER ID.
```

APPARATUS FOR PRODUCING OPERATIONAL MANUAL

BACKGROUND OF THE INVENTION

The present invention relates generally to apparatuses for producing an operational manual of a certain machine which teaches how to operate the machine, and more particularly to an apparatus for producing an operational manual appropriate to the level of skill of an operator of the machine, such as an office automation (abbreviated OA hereinafter) machine, a communication machine, or the like.

As a result of the great advances made in the development of OA machines and communication machines, such machines has become more and more complicated and thus difficult to use and the operational manuals thereof have become very large volumes. Thus, the operator cannot quickly find a how to operate a particular process or procedure in an operational manual. Accordingly, an apparatus having a so-called help function has been developed. The help function helps the operator by displaying help information items, each of which teaches how to operate a particular process or procedure, on a display screen when he/she pushes a help key. A predetermined process requested by the operator generally comprises a plurality of minimum procedures which can no longer be segmented, and the conventional help information item is prepared for every process and/or for every given combination of the minimum procedures. Incidentally, the help information is stored in a memory of the apparatus. Thus, since the kinds of the help information items are limited and the levels thereof are uniform, the help information items cannot always provide appropriate answers to the variety of questions with operators having various levels of skill.

Due to the above problem, various types of help functions for supplying an operator with the desired help information item by taking into account his/her experience and/or the content of the operation have been developed as described below:

Firstly, Japanese Laid-Open Patent Application No. 61-243518 discloses a help guide system in which help information items have been prepared for various kinds of combinations of the minimum procedures and automatically selected by analyzing data input and/or output by the operator, and in which the operator further selects the desired help information item from among the preselected help information items. If the operator cannot find the desired help information item, he/she can increase the number of the help information items to be selected. Since the number of the help information items indicated on the screen is limited, he/she can easily and quickly find the desired help information item.

Secondly, Japanese Laid-Open Patent Application No. 62-262120 discloses an operation guidance learning device in which help information items have been prepared for various kinds of combinations of the minimum procedures and the number thereof is limited by automatically removing the help information item pertaining to a particular operation which the same operator and/or operators belonging to the same group repeat more than a predetermined number of times. Alternatively, the help information items may be removed by an operator's command.

Thirdly, Japanese Laid-Open Patent Application No. 63-66623 discloses an intellectual operation backup system in which the optimal number of help information items is automatically limited by analyzing the operator's identification and experience, the machine's identification, and the like. Even in this reference, help information items have been prepared for various kinds of combinations of the minimum procedures.

Fourthly, Japanese Laid-Open Patent Application No. 1-280821 discloses a guide help system in which, by analyzing procedures which have already been performed by an operator, a series of subsequent procedures of a process is automatically produced and indicated on a screen, when the operator pushes the help key.

However, the above help functions disclosed in the references No. 61-243518, No. 61-262120, No. 63-66623 and No. 1-280821 are respectively disadvantageous.

As to the help functions disclosed by the references No. 61-243518, No. 61-262120 and No. 63-66623, since the number of the help information items prepared for various combinations of the minimum procedures is limited by the storage capacity of the memory, these help information items cannot always satisfy the operator. On the other hand, if the storage capacity of the memory is increased, the help function may handle more requests of the operator, but the cost of the apparatus will be increased. In addition, even the help function in Japanese Laid-Open Patent Application No. 1-280821 cannot satisfy all the various types of requests of the operator since the patterns of the series of subsequent procedures are preselected. And, as with the other three references, if the number of the patterns is increased, the storage capacity of the memory will also be increased and the machine having such a memory will become more expensive.

Furthermore, since each of the above conventional help functions operates as an auxiliary operational manual and the operator is required to acquire a certain degree of knowledge on how to use the apparatus by carefully reading the operational manual, they are unsuitable for a beginner.

SUMMARY OF THE INVENTION

Accordingly, it is a general object of the present invention to provide a novel and useful apparatus for producing an operational manual in which the above disadvantages are eliminated.

Another object of the present invention is to provide an inexpensive apparatus for producing an operational manual which supplies desired help information appropriate to the level of skill of each operator, including a beginner.

According to one feature of the present invention, an apparatus for producing an operational manual of a certain machine and supplying the same to an operator of the machine, the operational manual teaching how to operate a minimum procedure in order to obtain one of functions with which the machine is equipped, each of the functions comprising the plurality of minimum procedures which can no longer be segmented, and the apparatus being coupled to the machine, comprises first memory means for storing a help information item for every minimum procedure, each help information item indicating how to operate a corresponding minimum procedure, second memory means for storing operations which are input to the machine by the operator, detecting means, coupled to the second memory means, for analyzing the operations stored in the second memory means and for detecting a predetermined function desired by the operator, edit means, coupled to the first memory means and detecting means, for producing the operational manual containing help information items corresponding to the predetermined function, and for supplying the operational manual to the operator, and edit control means, coupled to the edit means, for judging whether or not a predetermined condition has been established and for instructing the edit means to produce and supply the operational manual to the operator if the edit control means judges the predetermined condition has been established.

According to another feature of the present invention, an apparatus for producing an operational manual of a certain machine and supplying the same to an operator of the machine, the operational manual teaching how to operate a minimum procedure in order to obtain one of functions with which the machine is equipped, each of the functions comprising the plurality of minimum procedures which can no longer be segmented, and the apparatus being coupled to the machine, comprises first memory means for storing a help information item for every minimum procedure, each help information item indicating how to operate a corresponding minimum procedure, second memory means for storing erroneous operations which are input to the machine by the operator, judging means, coupled to the second memory means, for judging whether or not the operator has made an erroneous operation more than a predetermined number of times, and edit means, coupled to said first memory means and judging means, for producing an operational manual containing help information item for a minimum procedure erroneously operated by the operator if the judging means has judged the erroneous operation has been made more than a predetermined number of times, and for supplying the operational manual to the operator.

According to still another feature of the present invention, an apparatus for producing an operational manual of a certain machine and supplying to an operator of the machine, the operational manual teaching how to operate a minimum procedure in order to obtain one of functions with which the machine is equipped, each of the functions comprising the plurality of minimum procedures which can no longer be segmented, and the apparatus being coupled to the machine, comprises first memory means for storing a help information item for every minimum procedure, each help information item indicating how to operate a corresponding minimum procedure, second memory means for storing operations which are input to the machine by the operator, detecting means, coupled to the second memory means, for analyzing the operations stored in the second memory means, for detecting an erroneous operation from among the operations stored in the second memory means, and for detecting a predetermined function desired by the operator, first edit means, coupled to the first memory means and detecting means, for producing an operational manual containing help information items corresponding to the predetermined function, and for supplying the operational manual to the operator, and second edit means, coupled to the detecting means, for producing an error report indicating the erroneous operation detected by the detecting means, and for supplying the error report to the operator whenever the operator makes an erroneous operation.

According to the present invention, the help information items are freely combined in the operational manual, so that the operational manual can always satisfy the various levels of skills of the operators. In addition, the operational manual is produced if the edit control means judges the predetermined condition has been established. Moreover, the operator can easily correct an erroneous operation because of the operational manual in which the erroneous operation is corrected and emphasized, or because of the error report.

Other objects and further features of the present invention will become apparent from the following detailed description when read in conjunction with the accompanying drawings.

BRIEF DESCRIPTION OF THE DRAWINGS

FIG. 11 shows an example of an operational manual output from the manual producing buffer shown in FIG. 9;

FIG. 13 shows an example of an operator manual output table;

FIG. 14 shows an example of an error code manual table stored in the data memory in the facsimile mail system shown in FIG. 1;

FIGS. 15a and 15b show a flowchart which is different from the flowchart shown in FIG. 6;

FIG. 17 shows an operator manual table;

FIG. 18 shows a time-out manual table;

FIGS. 20a and 20b show another example of a flowchart executed by the facsimile mail system shown in FIG. 1 which automatically produces an operational manual;

FIGS. 21a and 21b show an example of the error report;

FIG. 25 shows another example of the error report in accordance with the flowchart shown in FIG. 24.

DESCRIPTION OF THE PREFERRED EMBODIMENTS

Figure 1:
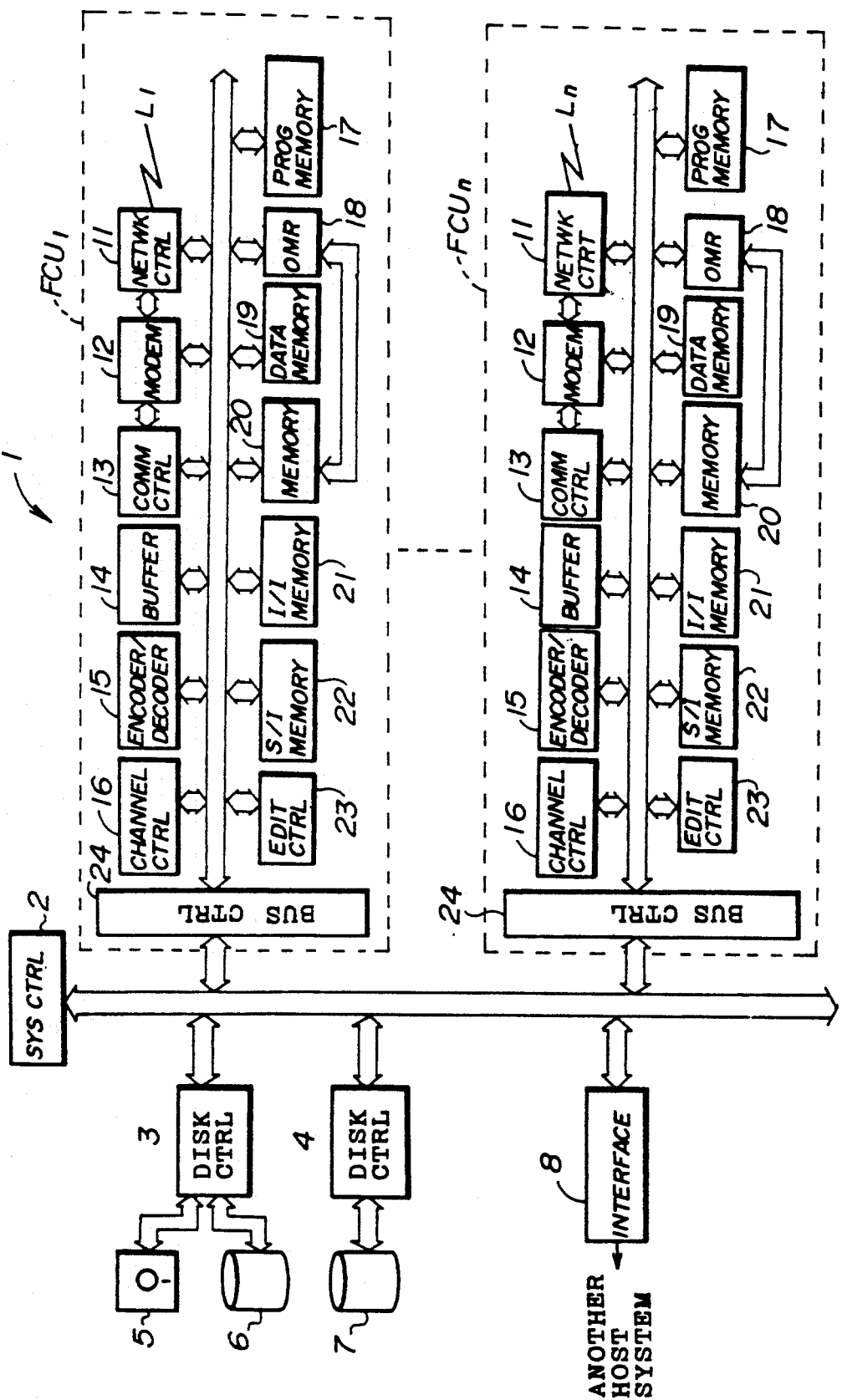
FIG. 1 shows a system block diagram of a facsimile mail system according to the present invention.

A facsimile mail system 1 according to the present invention comprises, as shown in FIG. 1, a system controller 2, disk controllers 3 and 4, a floppy disk driver 5, hard disk drivers 6 and 7, a host interface 8, and a plurality of communication processors FCUI to FCUn. Incidentally, the facsimile mail system 1 further comprises a keyboard (not shown), a keyboard controller (not shown) and a display unit (not shown). The system controller 2, the disk controllers 3 and 4, the host interface 8, and the respective communication processors FCUI to FCUn are operatively interconnected with each other via a bus. The apparatus for producing an operational manual according to the present invention is provided with each of the communication processors FCUI to FCUn. The disk controller 3 is operatively interconnected to the floppy disk driver 5 and the hard disk driver 6. The disk controller 4 is operatively interconnected to the hard disk driver 7. The facsimile mail system 1 has various service functions, such as a buckup function, a multicast function, a confidential communication function, a time designation transmission function, a mail board service function, a mail box function, and a broadcasting function. It is necessary for an operator of a terminal to execute a predetermined protocol and then request one of the above functions from the facsimile mail system 1 before he/she uses one of the above functions. The operator may use a mark sheet or a push button (PB) tone signal when he/she transmits some information to the facsimile mail system 1. According to the present invention, an operational manual which can achieve a desired service request is transmitted to the operator automatically or at the request of the operator of the terminal and/or the operator of the facsimile mail system 1.

The system controller 2 controls the operating of each part of the facsimile mail system 1 in accordance with programs stored in the floppy disk driver 5 and/or the hard disk drivers 6 and/or 7. The system controller 2 also controls the writing/reading of an image data in/from a floppy disk in the floppy disk driver 5 and hard disks in the respective hard disk drivers 6 and 7, and in addition, it controls the communication processors FCUI to FCUn to execute one of the service functions of the facsimile mail system 1.

The disk controllers 3 and 4 respectively control the floppy disk driver 5 and hard disk drivers 6 and 7. The floppy disk driver 5 and/or the hard disk drivers 6 and/or 7 respectively store various kinds of data, in particular a piece of mail received from the terminal or a host machine. In addition, the hard disk drivers 6 and 7 may store an error format, which will be described later.

The facsimile mail system 1 is connected to a host machine, such as a host computer or another facsimile mail system, via the host interface 8 so that they can communicate with each other. The host interface 8 may be a direct memory access controller (DMAC) which connects the facsimile mail system 1 directly to the host machine.

The number of the communication processors FCUI to FCUn corresponds to that of communication lines Ll through Ln. As indicated by a dotted line in FIG. 1, each of the communication processors FCUI to FCUn comprises a network controller 11, a MODEM 12, a communication controller 13, a manual producing buffer 14, an encoder/decoder 15, a channel controller 16, a control program memory 17, an optical mark reader (OMR) 18, a data memory 19, a temporary memory 20, an instructing information memory 21, a system information memory 22, an edit controller 23 and a bus controller 24. The respective elements of a communication processor are coupled to one another via a bus. In addition, the network controller 11 is further coupled to a corresponding one of the line networks Ll to Ln, and the MODEM 12. Each communication line may be a telephone line. The MODEM 12 is further connected to the communication controller 13. The temporary controller 20 is coupled to the OMR 18. Each communication processor is coupled to the bus, to which the system controller 2, disk controllers 3 and 4, or the like are connected.

This network controller 11 comprises a so-called AA-NCU (network control unit) which automatically processes outgoing/incoming call procedures.

The MODEM 12 modulates a signal to be transmitted therefrom and demodulates a signal transmitted thereto.

The communication controller 13 transmits and/or receives a protocol signal to/from a terminal via one of the communication lines Ll to Ln. The protocol signal is used, for example, when the operator of the terminal executes a predetermined protocol. The network controller 11, the MODEM 12, and the communication controller 13 constitute transmitting means for transmitting an operational manual to the communicatee terminal.

The manual producing buffer 14 stores the operational manual, and may store the various error formats.

The encoder/decoder 15 encodes the piece of mail, and decodes the encoded piece of mail.

The channel controller 16 sequentially controls each part of the communication processor in accordance with control programs, and additionally outputs an operational manual. Further, the channel controller 16 analyzes the service request stored in the temporary memory 20, and executes the requested service function. The channel controller 16 also identifies an operator of the terminal by comparing the received user ID with that stored in the system information memory 22. The channel controller 16 performs an error procedure by which the operator of the terminal can know that his/her request has been rejected. The channel controller 16 may also judge the presence of a data or a key input. Furthermore, the channel controller 16 has a timer therein, which will be described later.

The control program memory 17 stores various programs, some of which is used for the channel controller 16.

The OMR 18 judges whether or not a service request is transmitted by means of a mark sheet. If the operator uses the mark sheet, the OMR 18 optically reads marks and mark positions on the mark sheet, and store them in the temporary memory 20. The network controller 11, MODEM 12, communication controller 13, and OMR 18 control the receiving of data.

Figure 2:
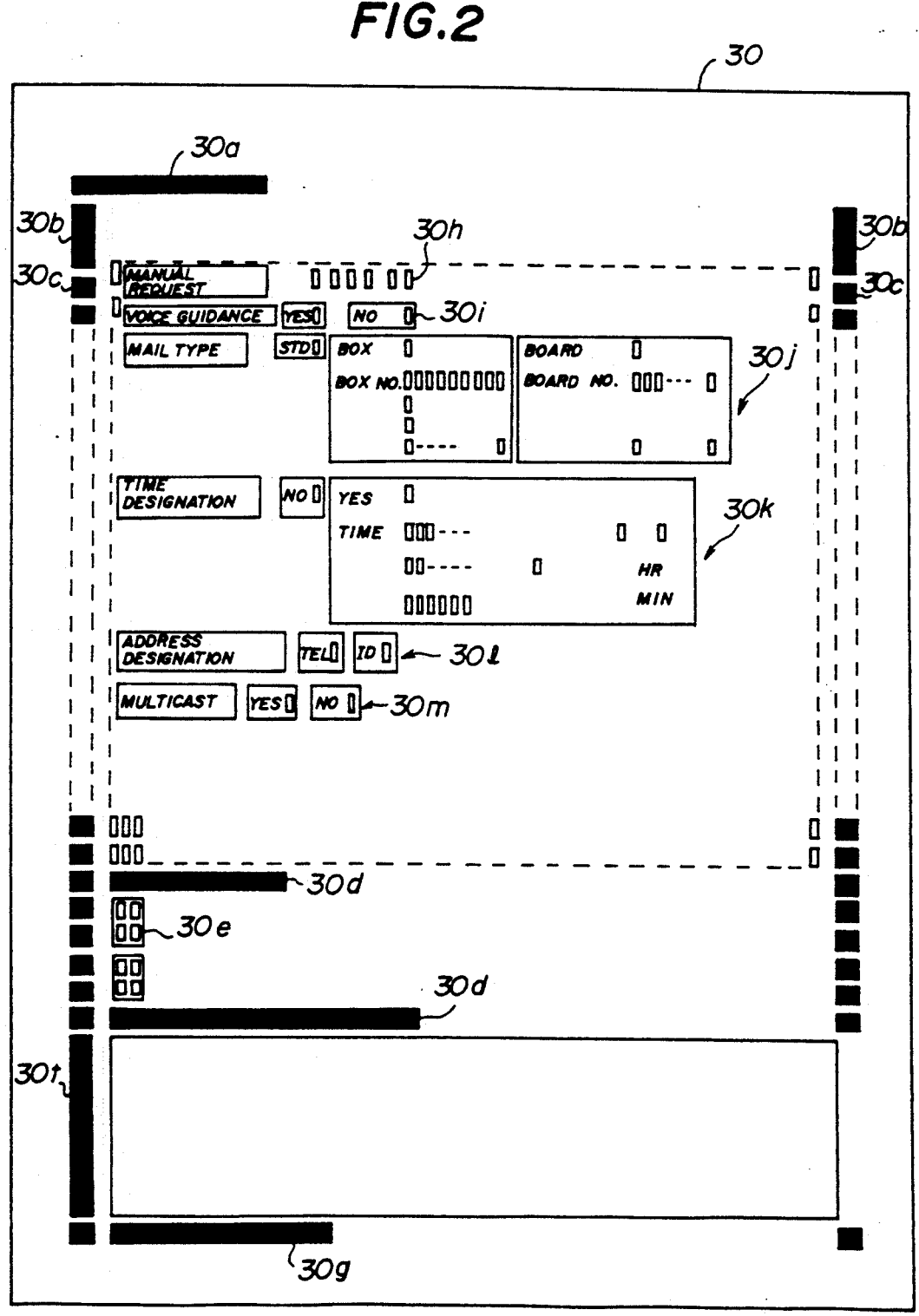
FIG. 2 shows an example of a mark sheet to be transmitted from the terminal to the facsimile mail system shown in FIG. 1.

A description will now be given of a mark sheet with reference to FIG. 2. A mark sheet 30 comprises a start mark 30a, maximum gradient judging marks 30b, timing marks 30c, mode switch marks 30d, special numeric letter mark 30e, a free region indication mark 30f, an end mark 30g, manual request marks 30h, voice guidance marks 30i, mail type marks 30j, time designation marks 30k, address designation marks 30l and multicast request marks 30m.

The start mark 30a indicates a beginning of a data on the mark sheet 30. The maximum gradient judging marks 30b indicate an initial gradient of the mark sheet 30, by which it is judged whether the mark sheet 30 is inserted and scanned in a correct direction. The timing marks 30c respectively clearly indicate mark positions on the mark sheet 30, by which each position of a mark lain between corresponding timing marks 30c can be identified. The mode switch marks 30d are respectively used for switching modes of the facsimile mail system 1. For example, the upper mode switch mark 30d informs the facsimile mail system 1 that there are normal marks above the upper mode switch mark 30d. On the other hand, the lower mode switch mark 30d informs the facsimile mail system 1 that there are special numeric letter marks 30e above the lower mode switch mark 30d. Each of the special numeric letter mark 30e represents a predetermined number by means of being drawn therein. The free region indication mark 30f informs the facsimile mail system 1 that there is an image comprising a figure and/or a message within a corresponding region. Therefore, the facsimile mail system 1 does not regard the image as a mark. The end mark 30g indicates an end of a data on the mark sheet 30. Incidentally, marks 30a to 30g are generically named as a control mark hereinafter. The manual request marks 30h indicate whether an operator of a terminal requests an operational manual. The voice guidance marks 30i indicate whether or not a voice guidance is selected. When the operator selects the voice guidance, he/she can hear an explanation, for example, by telephone. The mail type marks 30j select a kind of a piece of mail from among a standard mail type, a mail box type and a mail board type. Incidentally, a mail box and a mail board are respectively established by a serial number. The time designation marks 60k indicate whether the operator has designated a time. The address designation marks 30l indicates whether the facsimile mail system transmits a signal to the terminal by means of a telephone number of the terminal or an address ID thereof. The multicast request marks 30m indicates whether the operator requests a multicast transmission.

The data memory 19 stores a data only used for producing an operational manual from among data transmitted from the terminal. The data to be stored in the data memory 19 comprises an operational manual request command, a kind of operational manual (from among the various service functions of the facsimile mail apparatus 1), identifications of a communicatee terminal and/or an operator thereof, and the level of skill of the operator.

The data memory 19 may further store data of an operational resume for every terminal, every operator of the terminal and every operator of this facsimile mail apparatus 1. The operational resume indicates who transmits what data to whom. Moreover, the data memory 19 stores data which has been input to the terminal or this facsimile mail apparatus 1 in order to monitor the operator of the terminal.

Moreover, the data memory 19 may stores an operator manual searching table, an operator manual output table and various types of error code manual tables, which will be described later.

The temporary memory 20 temporarily stores the judging result of the OMR 18. In addition, it temporarily stores a piece of mail which is not transmitted as a mark sheet, or which is transmitted from the floppy disk driver 5 and/or the hard disk drivers 6 and/or 7 to a terminal.

Figure 3:
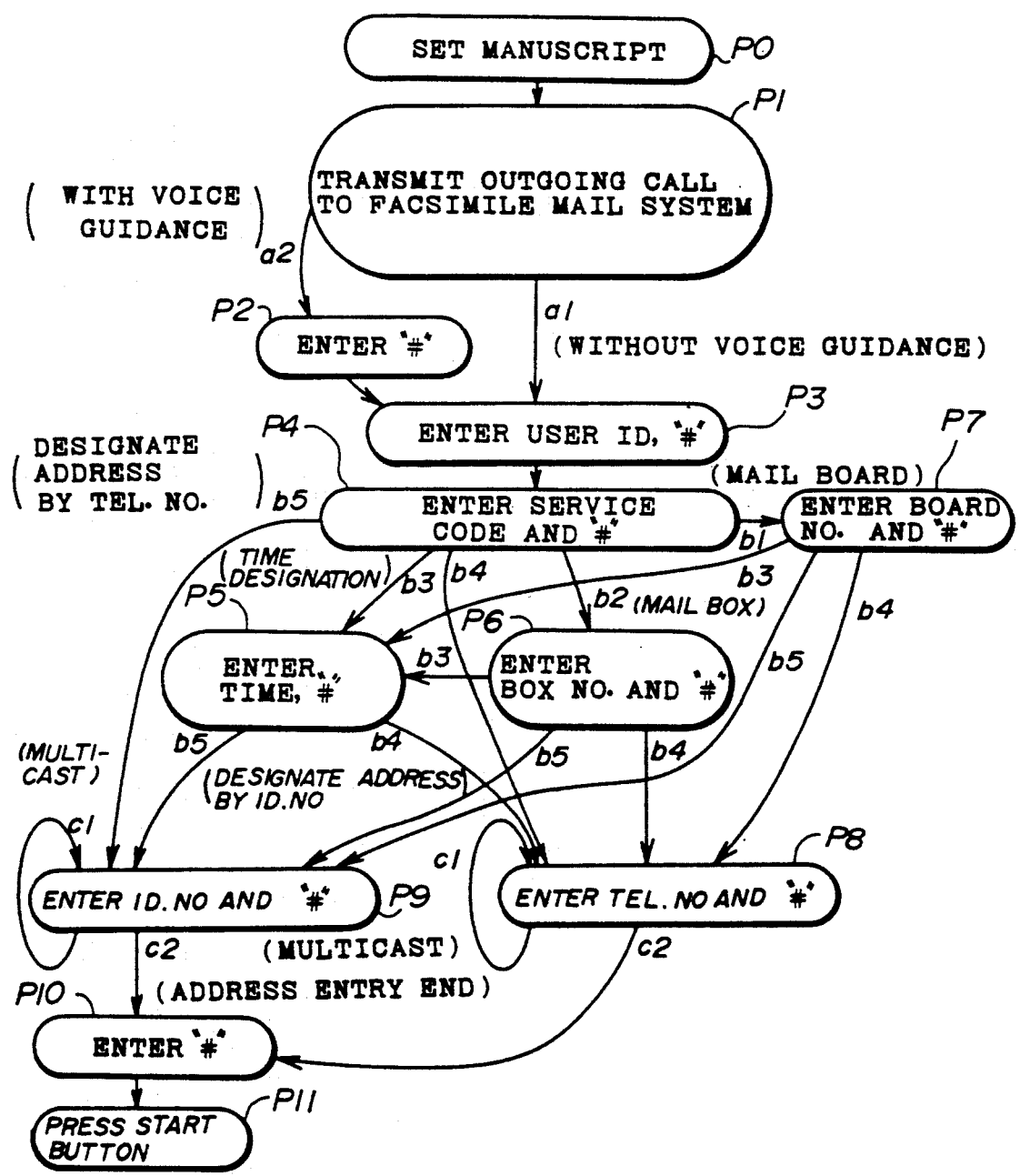
FIG. 3 shows minimum procedures to be operated by an operator of a terminal when the operator requests a predetermined service function to the facsimile mail system shown in FIG. 1.
Figure 4:
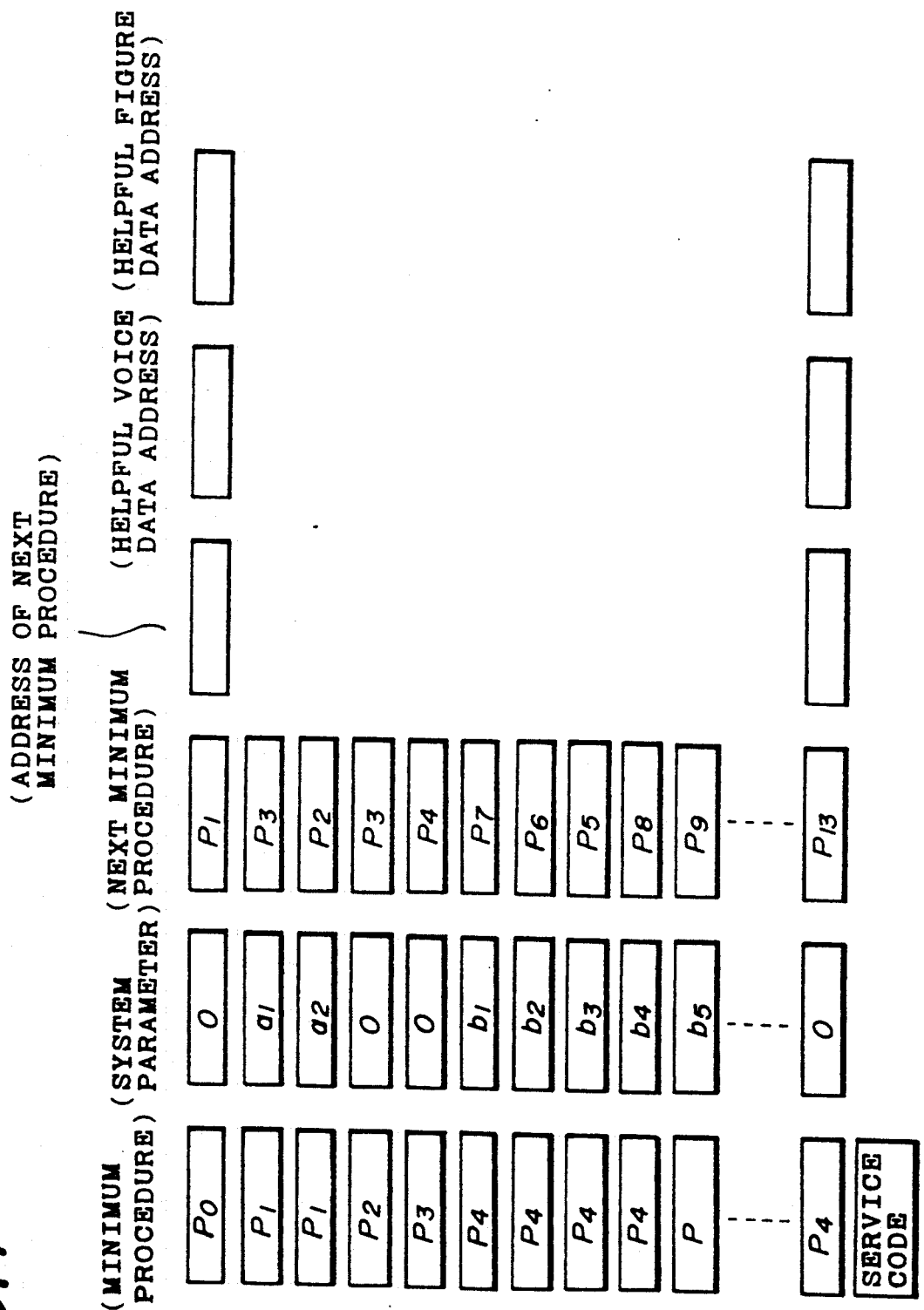
FIG. 4 shows a relationship between the minimum procedures shown in FIG. 3 and the system parameters shown in FIG. 5, which is stored in the instructing information memory in the facsimile mail system shown in FIG. 1.
Figure 5:
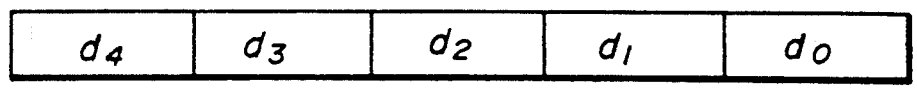
FIG. 5 shows a view for explaining system parameters used for the flowchart shown in FIG. 5.

The instructing information memory 21 stores help information items which are prepared for every minimum procedure shown in FIG. 3. An operator of a terminal operates in accordance minimum procedures shown in FIG. 3 to achieve a particular service function of this facsimile mail system 1. Each minimum procedure is correlated with a system parameter, as shown in FIG. 4, so that the next minimum procedure is freely generated by combining the minimum procedure and the system parameter, which will be described later. The instruct information memory 21 comprises a system parameter buffer therein. As shown in FIG. 5, the system parameter buffer stores system parameters therein. The respective system parameter determines a combination of the minimum procedures P0 to P11, so that the minimum procedures can be freely combined and various processes comprising such minimum procedures can be made. In FIG. 5, the system parameter d0 indicating whether or not the voice guidance is to be selected is determined based on the voice guidance marks 30i, so that either the minimum procedure P2 or P3 shown in FIG. 3 is selected after the minimum procedure P1. The system parameter d1 indicating a mail box or a mail board is determined based on the mail type marks 30j, so that either minimum procedure P6 or P7 shown in FIG. 3 may be selected after the minimum procedure P4. However, if an operator of the terminal selects a standard mail type in FIG. 2, one of minimum procedures b3 to b5 shown in FIG. 3 is selected. The system parameter d2 indicating a designated time is determines based on the time designation marks 30k, so that the minimum procedure P5 may be selected after the minimum procedure P4. The system parameter d3 indicating a telephone number of the terminal or an address identification thereof is determined based on the address designation marks 30l, so that either minimum procedure P8 or P9 shown in FIG. 3 may be selected after one of the minimum procedures P4 to P7. The system parameter d4 indicating a multicast transmission is determined based on the multicast request marks 30m, so that one of the minimum procedures P8, P9 and P10 is selected after either the minimum procedure P8 or P9.

The system information memory 22 stores various system information items, such as a user identification (ID) number, an address ID number, and a telephone number. The user ID is used for identifying an operator of each terminal. The address ID and the telephone number are respectively used for identifying each terminal. The system information memory 22 comprises a register in which a predetermined service code corresponding to a predetermined service function requested by the operator is stored. The system information item is used for executing one of the various functions of the facsimile mail system 1.

The edit controller 23 edits and produces an operational manual. The edit controller 23 has three counters "m", "n" and "l". The edit controller 23 checks the data stored in the data memory 19 to judge what kind of operational manual the manual is, the level of skill of the operator, and the like. In addition, it reads out the help information items from the instructing information memory 21, and produces the operational manual in the operational manual producing buffer 14. Moreover, if the system information item is stored in the system information memory 22, the edit controller 23 adds the system information item to the operational manual. The edit controller 23 may analyze the data stored in the data memory 19 to detect an error. If there is an erroneous operation, the edit controller 23 further analyzes what kind of error the error is and stores it in the hard disk drivers 6 and 7 in accordance with the kind of the error. The edit controller 23 edits and produces an error report in the operational manual producing buffer 14 by reading out the corresponding help information item from the instructing information memory 21.

Figure 6A:
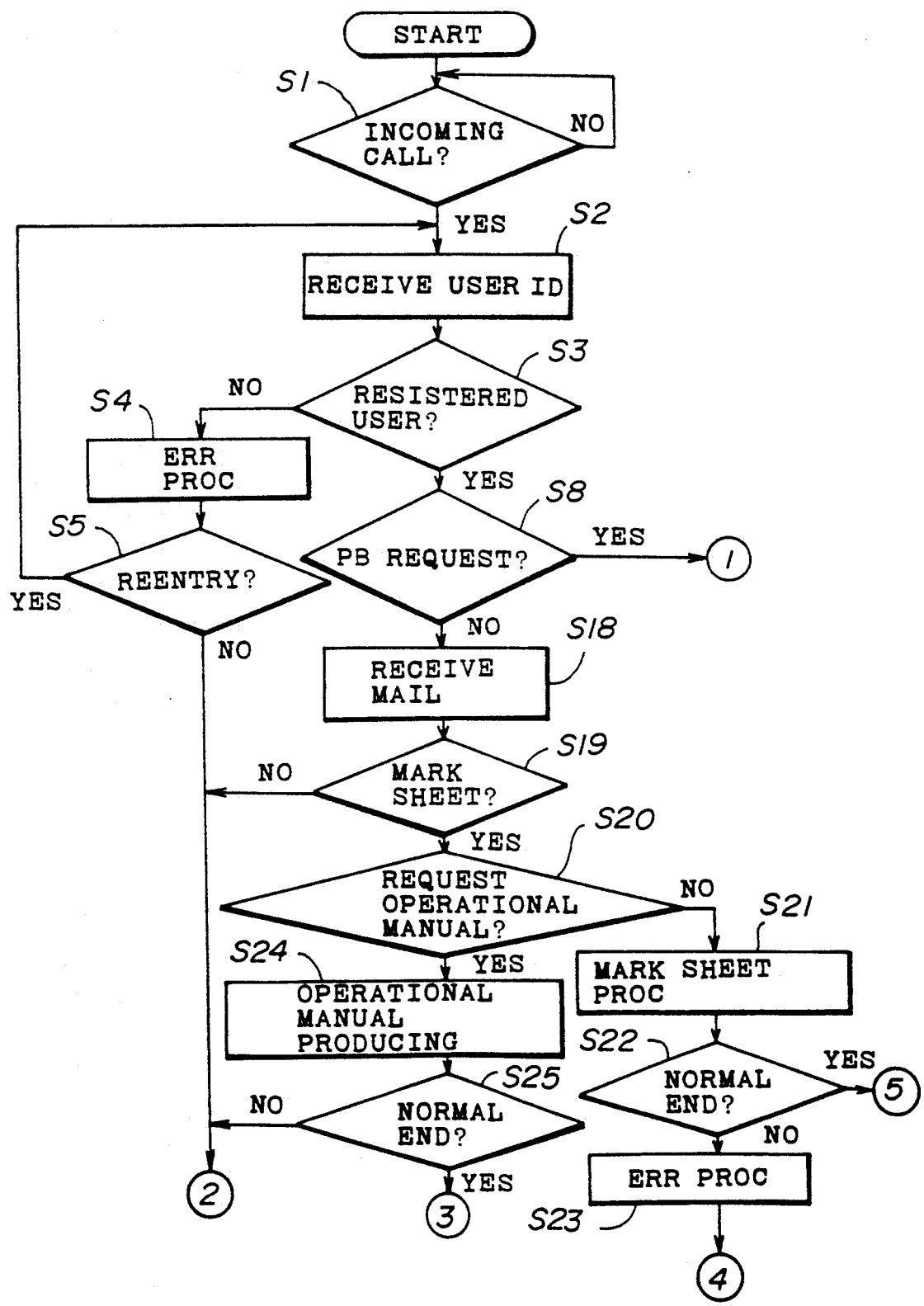
FIGS. 6a, 6b and 6c show a general flowchart executed by the facsimile mail system shown in FIG. 1 which processes an signal transmitted from the terminal.
Figure 6B:
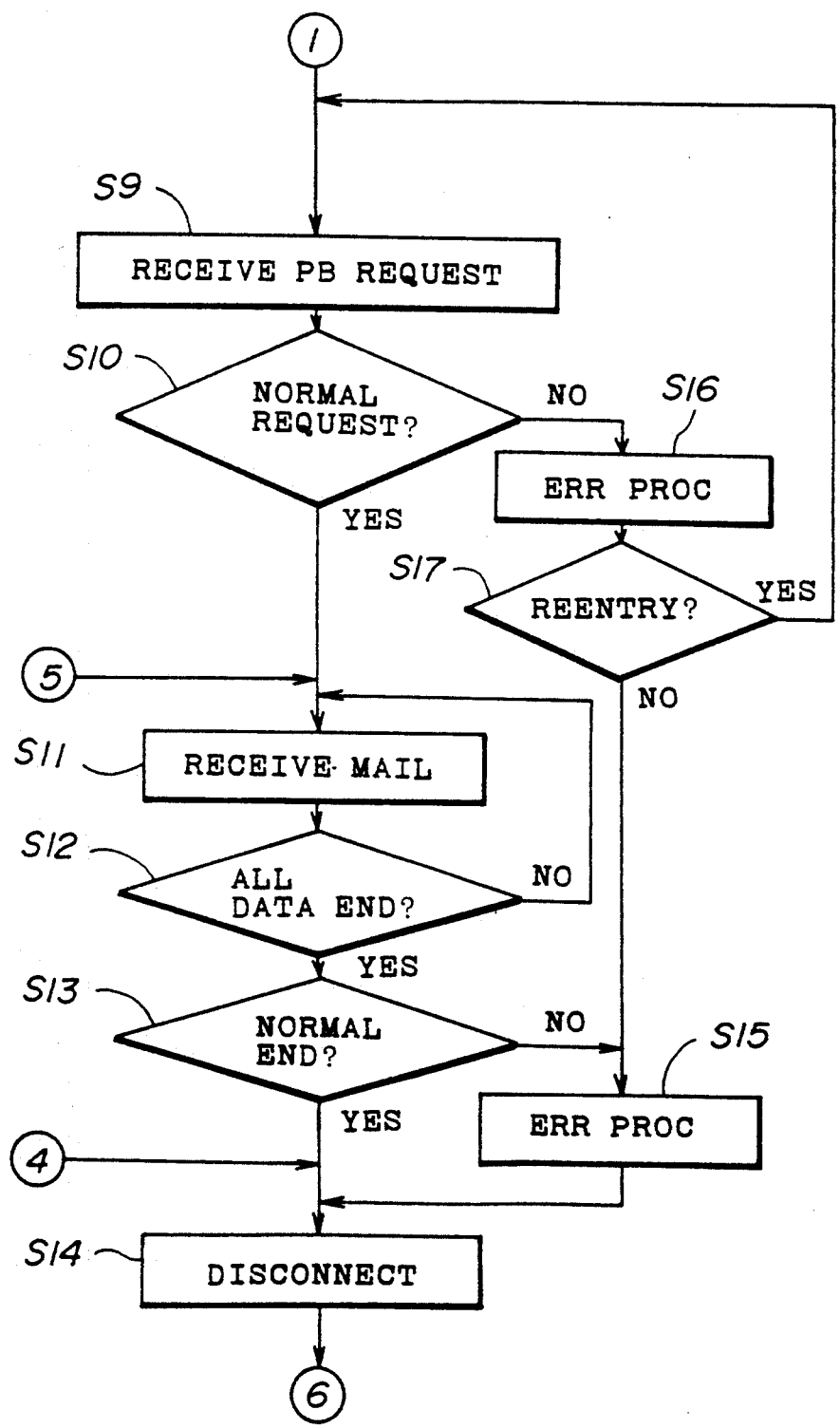
Figure 6C:
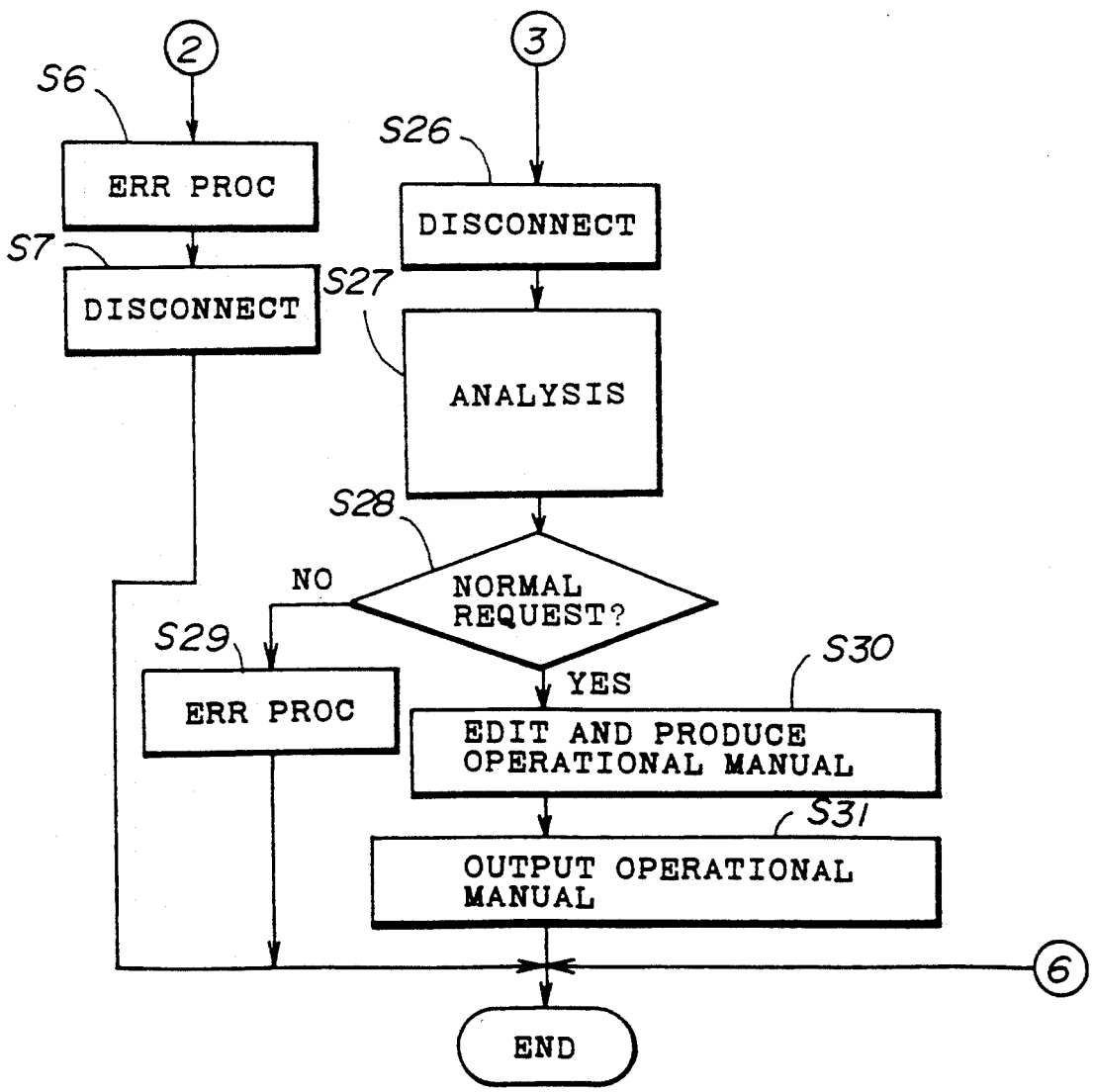

A description will now be given of the operation of the facsimile mail system 1 which processes a protocol established between the facsimile mail system 1 and a terminal, with reference to FIGS. 6A to 6C. The network controller 11 and the communication controller 13 first judge the presence of an incoming call from the terminal (in step S1). If the network controller 11 receives the incoming call, a user ID included therein is demodulated by the MODEM 12 and transmitted to the channel controller 16 (in step S2). Then the channel controller 16 judges whether or not the user ID has been registered in the system information memory 22 (in step S3). If the user ID has not been registered yet, the channel controller 16 performs an error procedure (in step S4). Then the channel controller 16 judges whether or not another data has been entered therein (in step S5). If another data has been entered, the procedure is fed back to the step S2. However, if another data has not been entered therein, the channel controller 16 performs the error procedure and disconnects a corresponding communication line between the facsimile mail system 1 and the terminal (in steps S6 and S7). Incidentally, the facsimile mail system 1 may supply an available service function to the operator even if his/her user ID has not been registered therein.

If the user ID has already been registered in the step S3, the channel controller 16 judges whether or not the operator requests a particular service function by means of a PB tone signal (in step S8). If the operator has used a PB tone signal, the channel controller 16 accepts the PB request (in step S9). Incidentally, the operational manual may be automatically produced and transmitted in response to the PB tone signal. Then the channel controller 16 judges whether or not a request by means of the PB tone signal (abbreviated PB request) is in accordance with a predetermined protocol (in step S10). For example, if the PB tone signal is clearly transmitted to the facsimile mail system 1, it is judged to be in such accordance. If the request is in such accordance, the communication controller 13 starts to receive a piece of mail (in step S11). Subsequently, the channel controller 16 judges whether or not all the received piece of mail are in accordance with a protocol (in steps S12 and S13). For example, if a number of error lines is less than a predetermined value, all the received piece of mail are judged to be in such accordance. Lastly, a corresponding communication line is disconnected (in steps S14 and S15). However, if all the received piece of mail are not in such accordance, the channel controller 16 performs the error procedure and disconnects the corresponding communications line (in steps S15 and S14). Incidentally, the operational manual may be simultaneously produced during the error procedure.

On the other hand, if the PB request is judged not to be in accordance with the protocol in the step S10, the channel controller 16 performs the error procedure (in step S16), so that the operator of the terminal can notice that the PB request has been rejected. Then, the channel controller 16 judges whether or not another data has been entered therein (in step S17). If another data has been entered, the procedure is fed back to the step S9. However, if another data has not been entered therein, the channel controller 16 performs the error procedure and disconnects a corresponding communication line (in steps S15 and S14), so that the operator can know that the communications line is disconnected. Incidentally, the operational manual may be produced during the error procedure.

If the operator requests the particular service function by means of the mark sheet, the channel controller 16 judges whether or not the mark sheet has requested an operational manual based on the received piece of mail (in steps S18 to S20). The channel controller 16 can judges whether the piece of mail is transmitted by the mark sheet by detecting the control mark on the mark sheet. If the mark sheet has not requested the operational manual, the mark sheet is generally processed (in step S21). That is, each mark and each mark position are read by the OMR 18, and the result is stored in the temporary memory 20 and then analyzed by the channel controller 16. The channel controller 16 judges whether or not all the data on the mark sheet is in accordance with a protocol (in step S22). If the channel controller 16 judges NO, it performs the error procedure and then disconnects the corresponding communication line (in steps S23 and S14). Incidentally, the operational manual may be produced during the error process. However, if the channel controller 16 judges that all the piece of mail is in accordance with the protocol, the procedure is fed back to the step S11.

If the mark sheet requests the operational manual at the step S20, the channel controller 16 edits and produces the operational manual (in step S24). Then, the channel controller 16 judges whether or not all the data on the mark sheet is in accordance with a protocol (in step S25). If all the data is not in accordance with the protocol, the procedure is fed back to the step S6. However, if all the data is in accordance with the protocol, the channel controller 16 temporarily disconnects the corresponding communications line (in step S26), and analyzes the data on the mark sheet (in step S27). Incidentally, whether the channel controller 16 temporarily disconnects the communication line is a matter of choice. The channel controller 16 analyzes the data in accordance with procedures shown in FIGS. 7A and 7B, which will be described later. Each mark and each mark position are read by the OMR 18, and the results are stored in the temporary memory 20 and then analyzed by the channel controller 16. The channel controller 16 judges whether or not all the data on the mark sheet is in accordance with a protocol (in step S22). Subsequently, the facsimile mail system 1 judges whether or not all the data on the mark sheet are in accordance with the predetermined protocol (in step S28). If the facsimile mail system 1 judges NO, the error process is performed and the procedure ends (in step S29). Incidentally, the operational manual may be produced during the error process. On the other hand, if the facsimile mail system 1 judges YES in the step S28, the operational manual is edited, produced and output to the operator automatically and/or by request (in steps S30 and S31). Incidentally, if the channel controller 16 disconnects the communication line at the step S26, the channel controller 16 connects it again before it transmits the operational manual.

Figure 7A:
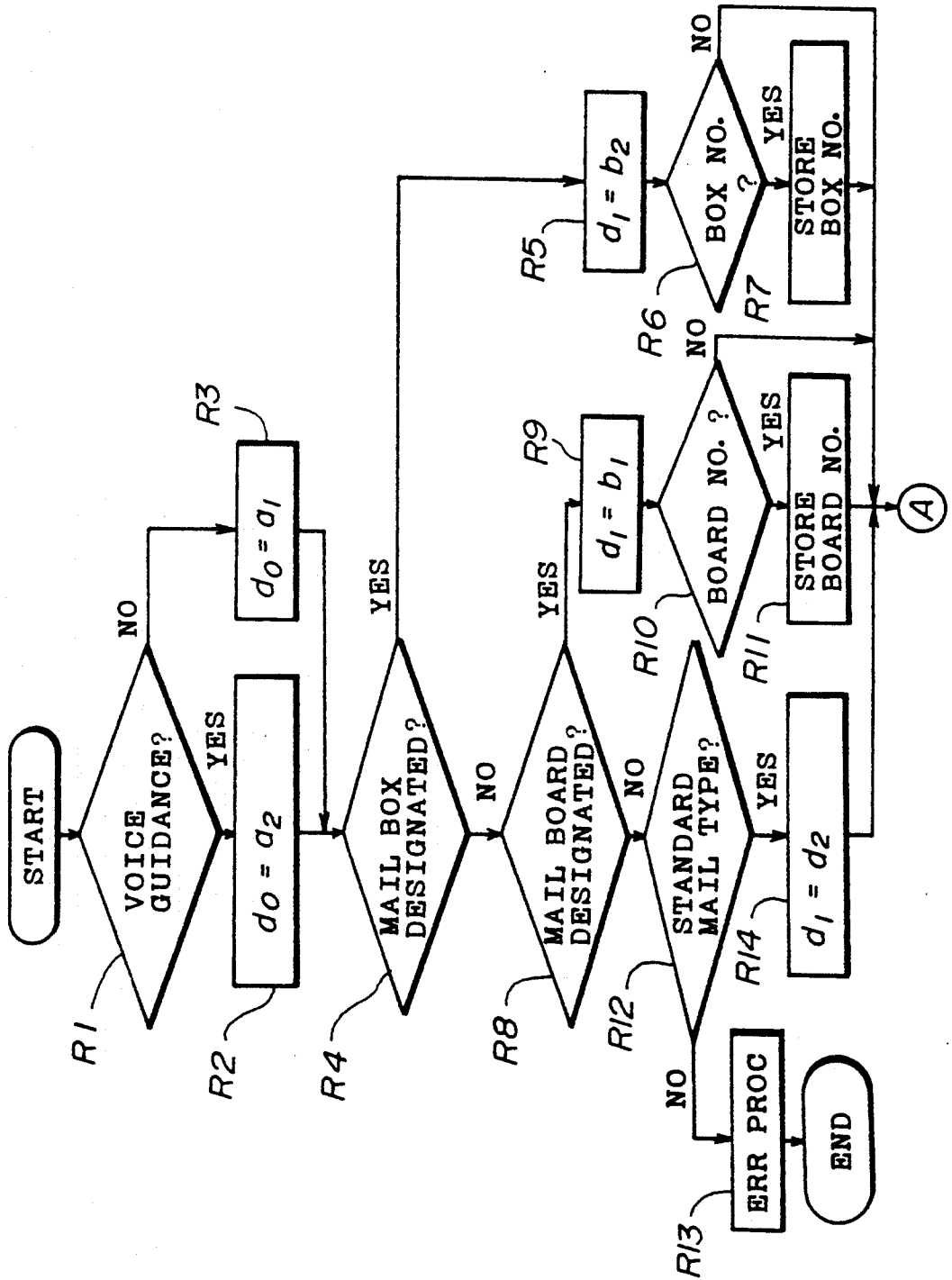
FIGS. 7a and 7b show a part of a flowchart shown in FIG. 6 which is indicated in detail.
Figure 7B:
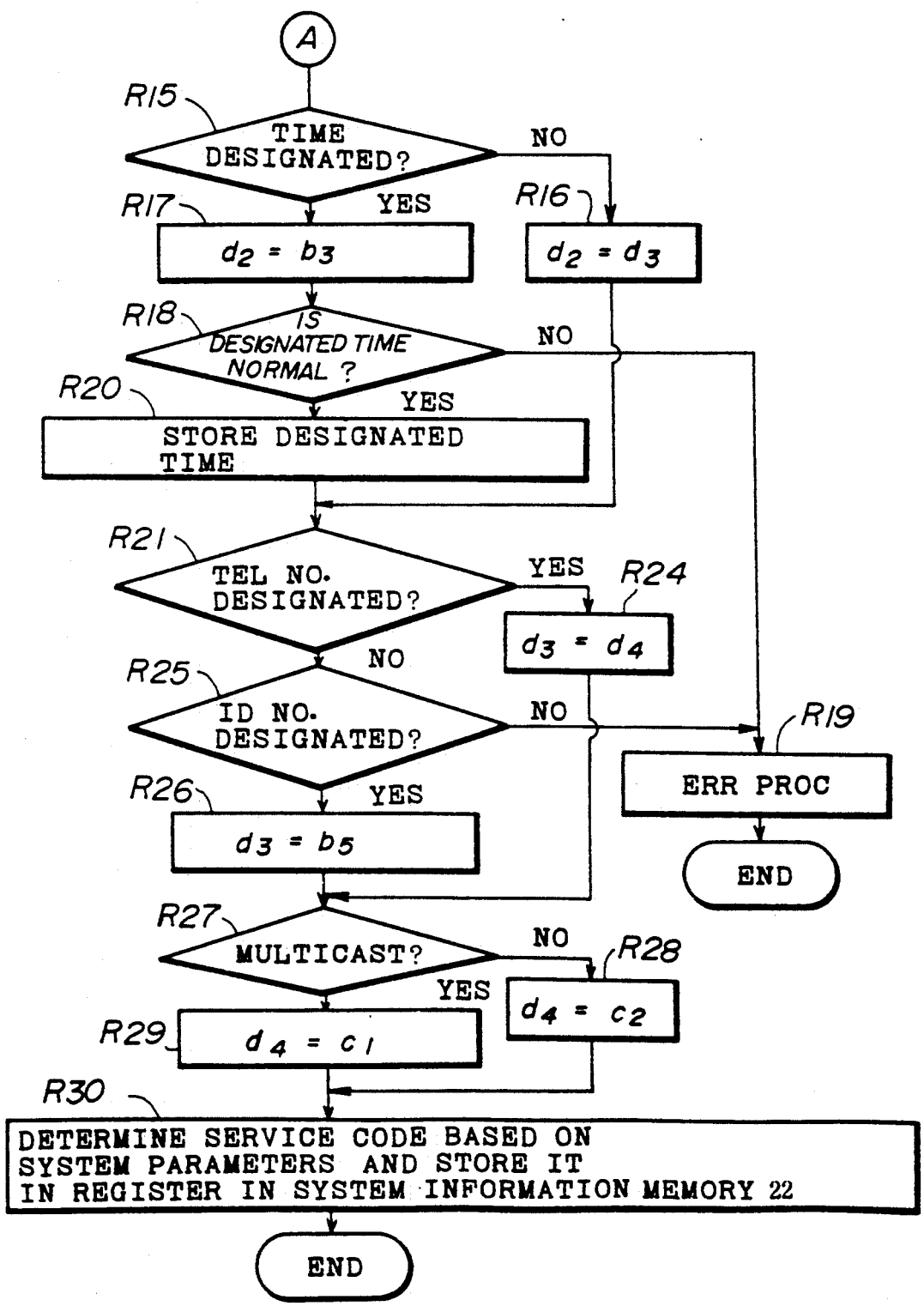

A detailed description will now be given of the procedure in the step S27 with reference to FIGS. 7A and 7B. The channel controller 16 first judges the presence of a voice guidance based on the voice guidance marks 30$i$ (in step R1). If the voice guidance has been selected, the channel controller 16 substitutes a2 for a system parameter d0 in a system parameter buffer within the instruction information memory 21 (in step R2). In this case, the minimum procedure P2 shown in FIG. 3 has been selected after the minimum procedure P1. However, if the voice guidance has not been selected, the channel controller 16 substitutes a1 for the system parameter d0 (in step R3). In this case, the minimum procedure P3 shown in FIG. 3 has been selected after the minimum procedure P1.

Next, the channel controller 16 determines the system parameter d1 (in steps R4 and R8). That is, the channel controller 16 judges what type the mail is based on the mail type marks 30$j$. If the mail box has been selected, the channel controller 16 substitutes b2 for the system parameter d1 (in steps R4 and R5). In this case, the minimum procedure P7 shown in FIG. 3 has been selected after the minimum procedure P4. Then the channel controller 16 judges whether the mail box number is present in order to store it in the system information memory (in steps R6 and R7). However, if the mail board has been selected, the channel controller 16 substitutes b1 for the system parameter d1 (in steps R8 and R9). In this case, the minimum procedure P6 shown in FIG. 3 has been selected after the minimum procedure P4. Then the channel controller 16 judges whether the mail board number is present in order to store it in the system information memory (in steps R10 and R11). If the operator has selected a standard mail type, the channel controller 16 makes the system parameter d1 equal to the system parameter d2 (in steps R12 and R14). But if the operator has not specified a mail type, the channel controller 16 informs the operator that an error has been made, and terminates the procedure (in steps R12 and R13).

If the mail box number or the mail board number has not been entered by the operator (in steps R6 and R10), the procedure is transferred to step R15 which is after the steps R7, R11 and R14.

In the step R15, the system parameter d3 is determined. If the operator has designated a time by the time designation marks 30$k$, the channel controller 16 substitutes b3 for the system parameter d2 (in step R15). Then the channel controller 16 judges whether or not the designated time is in accordance with a protocol (in step R18). If the designated time is judged to be in such accordance, the channel controller 16 stores it in the system information memory 22 (in step R20). However, if the designated time is judged not to be in such accordance, the channel controller 16 informs the operator of the occurrence of an error and terminates the procedure (in step R19). On the other hand, if the operator has not specified the time, the channel controller 16 makes the system parameter d2 equal to the system parameter d3 (in step R16). After the step R16 or R20, the channel controller 16 determines the system parameter d3.

That is, the channel controller 16 judges whether or not a telephone number has been designated as an address of the terminal (in step R21). If the telephone number has been designated, the channel controller 16 makes the system parameter d3 equal to the system parameter d4 (in step R24). However, if the telephone number has not been designated, then the channel controller 16 judges whether an address ID has been designated as the address of the terminal (in step R25). If the address ID has not been designated, the procedure is transferred to the step R19. However, if the address ID has been designated, the channel controller 16 substitutes b5 for the system parameter d3 (in step R26). After the step R24 or R26, the channel controller 16 determines the system parameter d4.

That is, the channel controller 16 judges whether or not the operator has selected a multicast transmission (in step R27). That is, if the operator has requested the multicast, the channel controller 16 substitutes c1 for the system parameter d4 (in step R29). On the other hand, if the operator has not requested the multicast, the channel controller 16 substitutes c2 for the system parameter d4 (in step R28). Then the operator determines a service code corresponding to the service function requested by the operator based on the identified system parameters d0 to d4, and stores it in a register (in step R30).

Figure 8A:
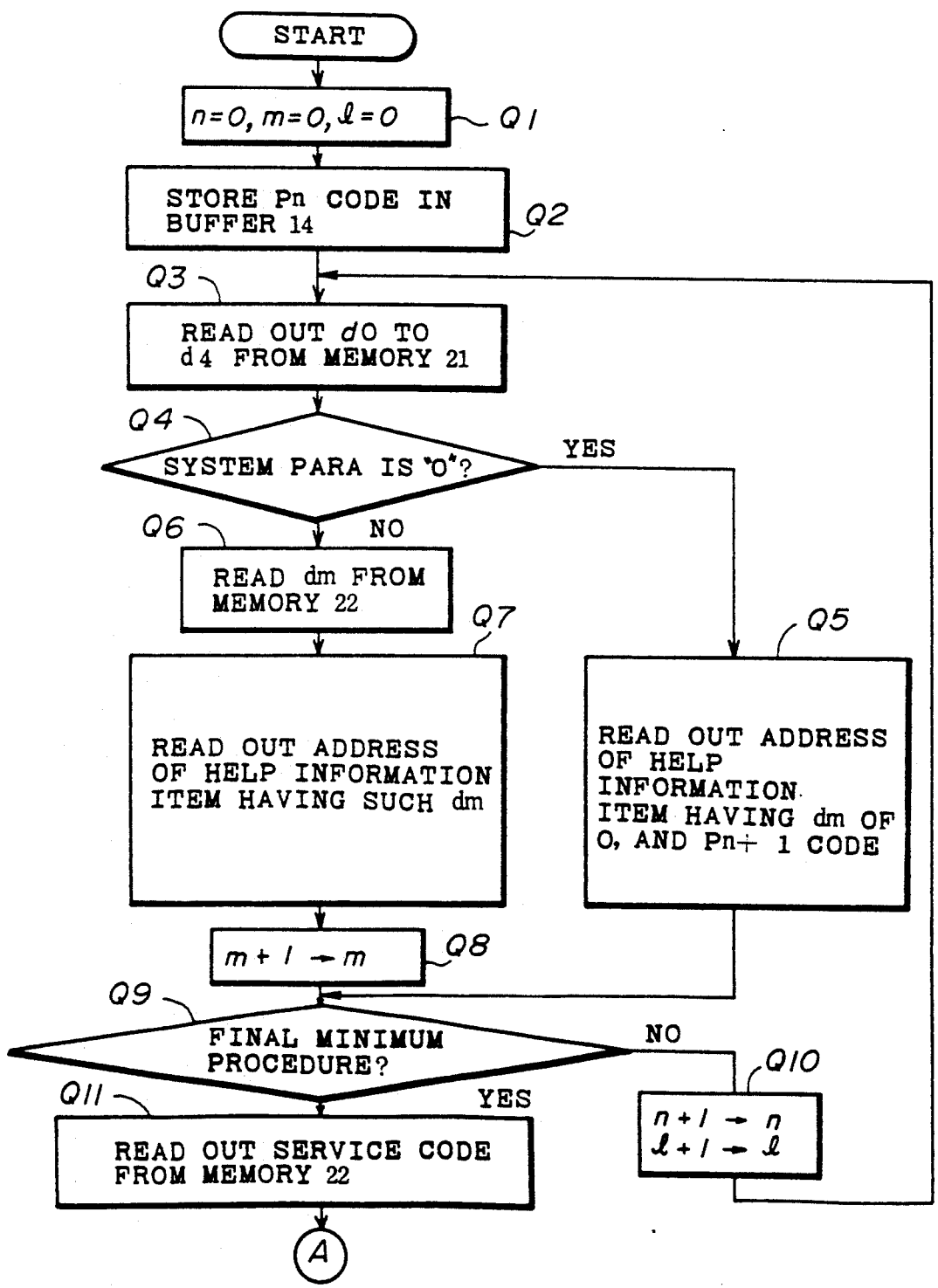
FIGS. 8a and 8b show a part of a flowchart shown in FIG. 6 which is indicated in detail.
Figure 8B:
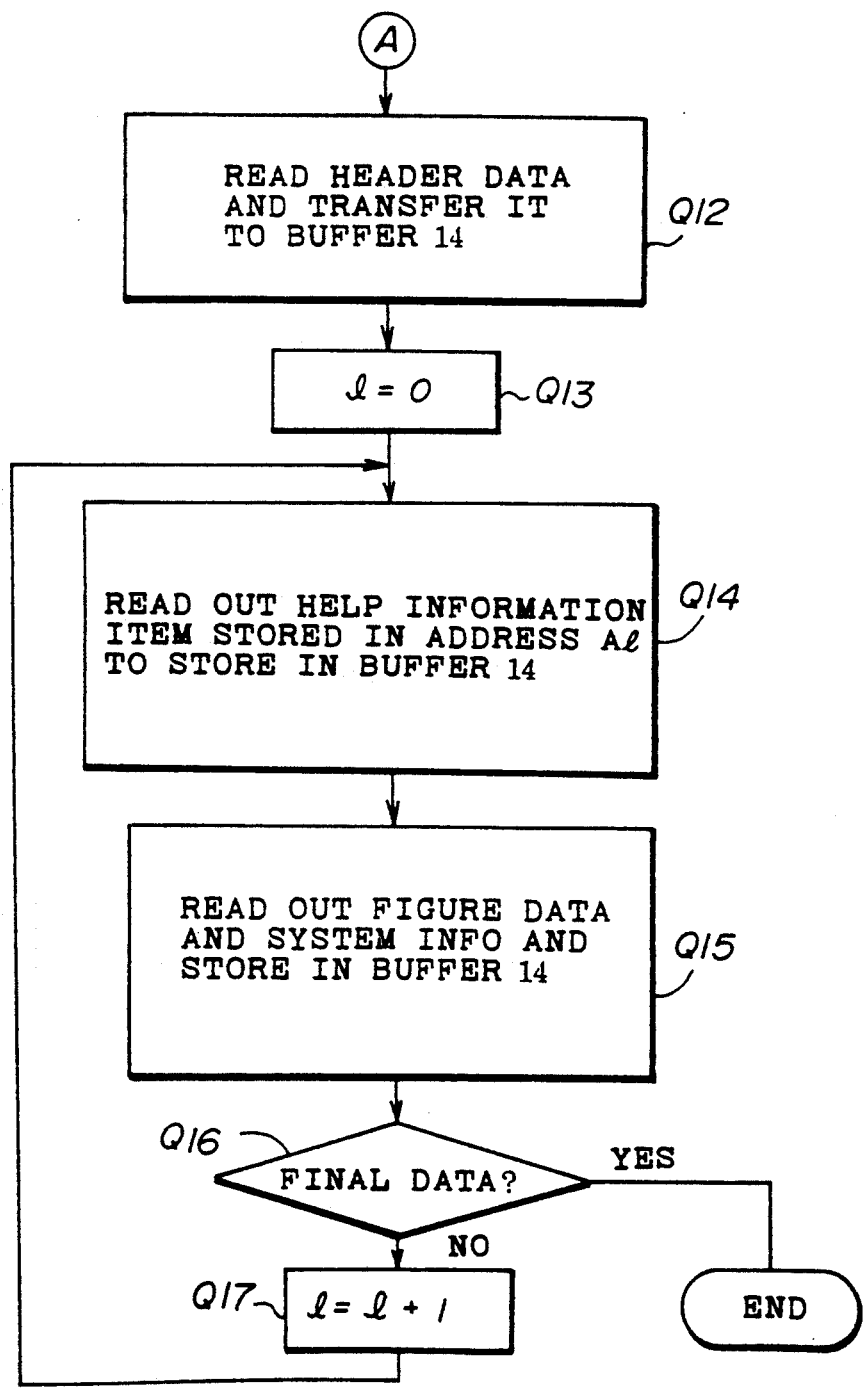

A detailed description will now be given of the procedure in the step S30 with reference to FIGS. 8A and 8B. The edit controller 23 resets its counters "n", "m" and "1" to "0" (in step Q1), and stores a code of each minimum procedure Pn shown in FIG. 3 in the manual producing buffer 14 (in step Q2). That is, the code of the minimum procedure P0 is first stored in the manual producing buffer 14. Next, the edit controller 23 reads out the system parameters d0 to d4 from the instructing information memory 21 (in step Q3), and judges whether or not each system parameter is "0" (in step Q4). If "0" is substituted for a system parameter, the system parameter does not actuate the operation of the edit controller 23. Hereupon, the system parameters d0 to d4 are generically named "dm" hereinafter. If the "dm" is "0", the edit controller 23 reads out an address of the help information item of a minimum procedure Pn having a system parameter of "0" and a code of a next minimum procedure Pn+1 to store them in the manual producing buffer 14 (in step Q5). However, as for the "dm" which is not "0", the edit controller 23 reads out the "dm" from the system information memory 22 (in step Q6). Then the edit controller 23 additionally reads out an address of the help information item corresponding to the minimum procedure Pn having the "dm" and a code of a next minimum procedure Pn+1 from the instructing information memory 21 to store them at an address A1 in the manual producing buffer 14 (in step Q7). Each minimum procedure Pn is correlated with a system parameter dm, as shown in FIG. 4. Therefore, once the step Pn and system parameter are determined, the next minimum procedure Pn+1 and its help information item will be determined.

Figure 9:
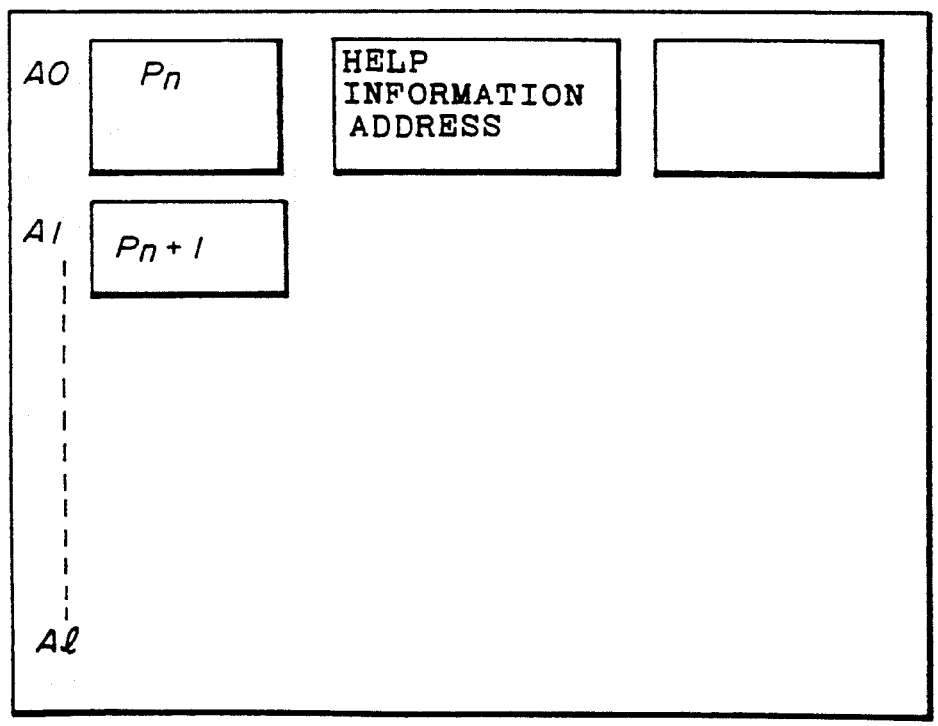
FIG. 9 shows a construction of a manual producing buffer in the facsimile mail system shown in FIG. 1.

As mentioned above, after the next minimum procedure Pn+1 and an address of its help information item is determined, the channel controller 16 counts up the value of the counter (in step Q8), and judges whether it is the final minimum procedure (in step Q9). If it is not final minimum procedure, the edit controller 23 counts up the respective counters "n" and "1", and repeats the procedures from the step Q3. But if the minimum procedure is the final minimum procedure, the manual producing buffer 14 stores, as shown in FIG. 9, the code of the minimum procedure Pn and the address of its help information item at the address A1 thereof.

Figure 10:
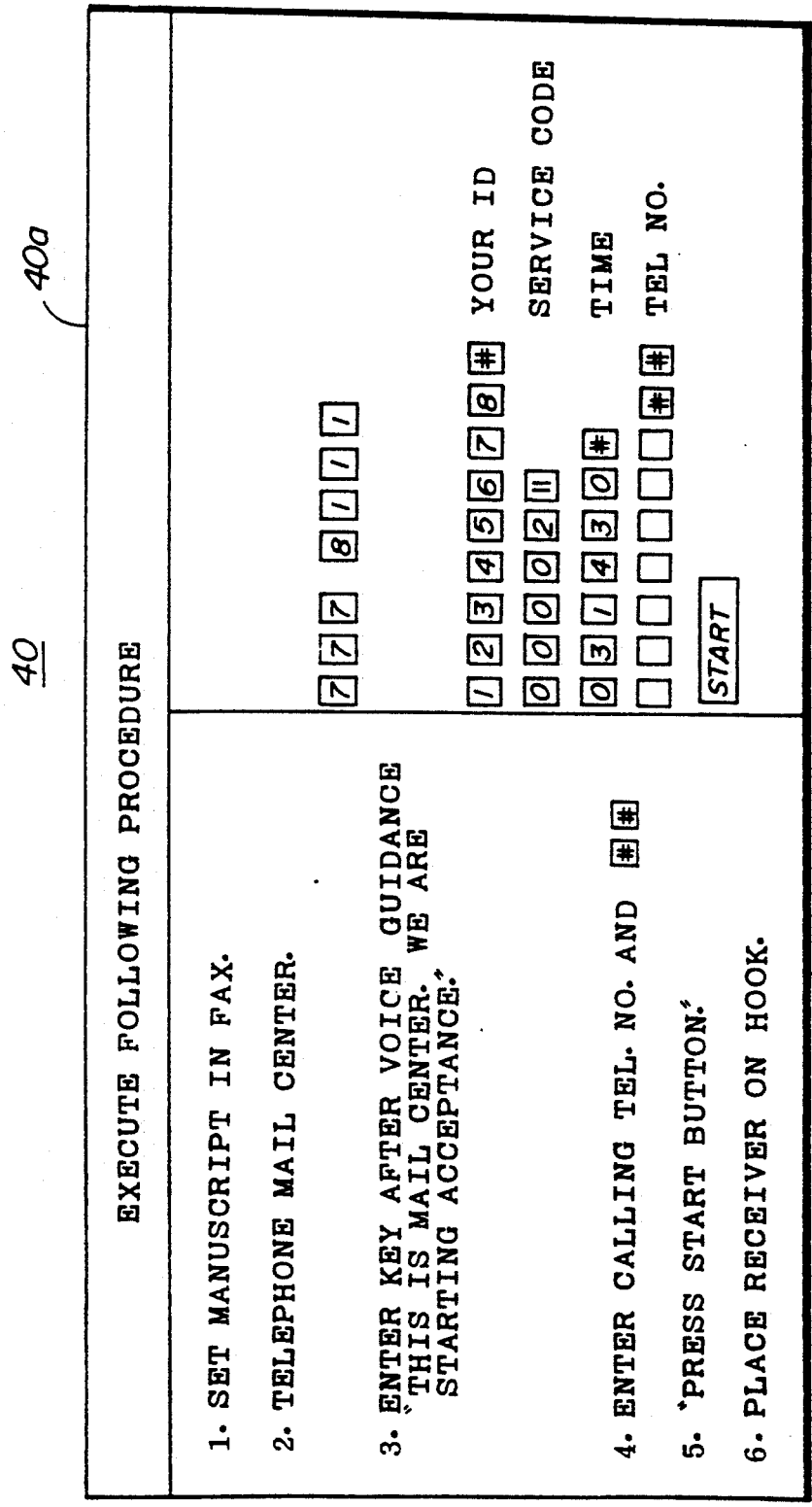
FIG. 10 shows an example of a manual stored in the manual producing buffer shown in FIG. 9.

Next, the channel controller 16 reads out a service code from the system information memory 22 (in step Q11), and extracts and transfers a corresponding header information item to a header region 40a of an operational manual 40 within the manual making buffer 14, as shown in FIG. 10, (in step Q12). Then, a step Q13 resets the counter "1" to "0" (in step Q13). The help information item stored in the address A1 is read out and stored in the character data region 40a in the manual producing buffer 40 (in step Q14). In addition, a helpful figure data and the system information, such as a telephone number, an address ID, and the like, are respectively read out and stored in an image region 40c in the manual producing buffer 14 (in step 15). The helpful figure data has been stored in the instructing information memory 21 in advance correlatively with the help information item or independently of it. After each information corresponding to the address A1 is stored in the manual producing buffer 14, the channel controller 16 judges whether it is the final data (in step 16). If it is not final data, 1 is added to a value of the counter "1" and the procedure is transferred to the step Q14 (in step Q17). Likewise, the procedure continues until all the help information items, helpful figure data and the system information are stored in the manual producing buffer 14.

Lastly, the operational manual 50 shown in FIG. 11 is output in eye-readable form to the operator, and thus he/she can obtain a desired service function of the facsimile mail system 1 by operating procedures in accordance with the help information items in the operational manual.

A detailed description will now be given of another example of the step S16 shown in FIG. 6B. In this embodiment, the facsimile mail system 1 supplies the operator with an operational manual when the operator erroneously uses a PB request. However, before the operation of the facsimile mail system 1 is explained, a description will now be given of a operator manual output table searching table 60, an operator manual output table 62 and an error code manual table 64 which are to be stored in the data memory 19.

Figure 12:
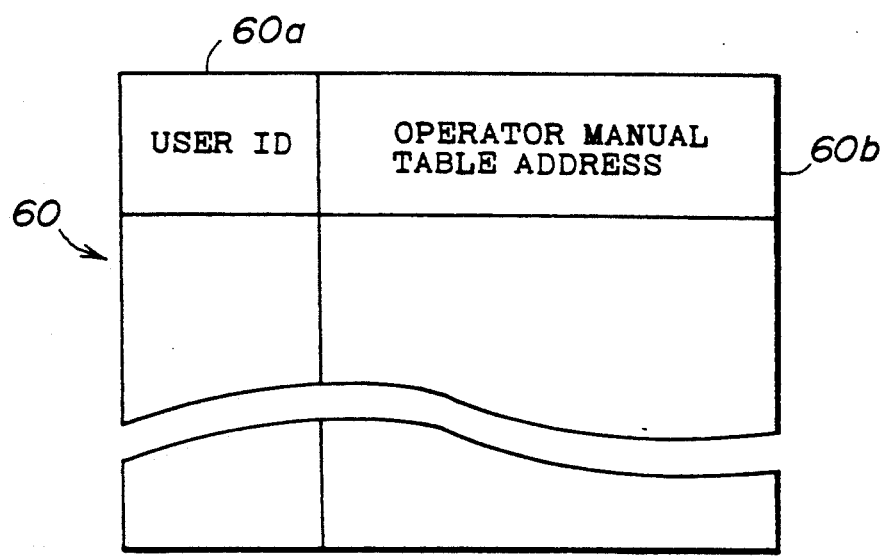
FIG. 12 shows an operator manual output table searching table.

The operator manual output table searching table 60 is, as shown in FIG. 12, used for searching the operator manual output table 62. The operator manual output table searching table 60 comprises the 10 items of a user ID 60a and an operator manual output table address 60b. Due to this table 60, if only a user ID is transmitted, the operator manual output table 62 corresponding to the user ID can be searched.

The data memory 19 also stores the operator manual output table 62 shown in FIG. 13. The operator manual output table 62, prepared for every operator, indicates a relationship between a kind of an error and the number thereof. The operator output table 62 comprises the items of an error code 62a, an error counter 62b, a help information address 62c, an N entry 62d, an allowable error number 62e and a current entry number 62f.

The error code item 62a indicates a code of a minimum procedure which the operator has erroneously operated. Each error code is written down based on an error format. The error format indicates a relationship between an error and its error code, and is stored in the hard disk drivers 6 and/or 7. Therefore, no error code is written down until the operator makes an error. The error counter item 62b indicates how many times the operator has made a corresponding error. That is, the error counter item 62b counts the number of errors corresponding to the adjacent error code. The help information address item 62c indicates an address of the help information item of a minimum procedure corresponding to the error code. The N entry 62d indicates a number of items, so that the error code item 62a, the error counter item 62b and the help information address item 62c are respectively segmented into N items, such as 0, 1, ..., N−2 and N−1. Since only "N" error codes can be written down in this table, the (N+1)th error code is overwritten at the item of "0". The allowable error number item 62e indicates a number of error items limit. If a value of one error counter item 62b reaches a value of the allowable error number item 62e, the edit controller 23 produces an operational manual based on the corresponding help information address 62c. Incidentally, the allowable error number item 62e is prepared for every error counter item 62b. The current entry number item 62e indicates the lowest number in the N entry item 62d. For example, if five error codes are written down in the table 62, the current entry number is 4.

Furthermore, the data memory 19 stores an error code manual table 64 shown in FIG. 14. The error code manual table 64 comprises the items of error code 64a and help information address 64b. The error code item 64a is prepared for all conceivable error codes. The help information address 64b corresponds to the help information address 62c shown in FIG. 13, so that a description thereof will be omitted.

As shown in FIG. 15, when the communication controller 13 receives an incoming call (in step C1), the channel controller 16 identifies a user ID (in step C2). Then the channel controller 16 judges whether or not the operator is using a PB request (in step C3). If the operator is using an OMR request, the channel controller 16 processes in accordance with the flowchart shown in FIGS. 6 and 7 (in step C4). However, if the operator is using the PB request, the channel controller 16 accepts the request (in step C5), and judges whether or not the PB request is in accordance with a predetermined protocol (in step C6). For example, if the operator has entered a wrong figure number via the PB, the PB request is judged not to be in such accordance. If the PB request is judged to be in such accordance, the channel controller 16 starts to process a piece of mail (in step C7). However, if the PB request is not in such accordance, the channel controller 16 obtains an operator manual output table 62 from the operator manual output table searching table 60 in the data memory 19 based on the user ID (in step C8).

Then, the channel controller 16 judges whether or not an error code corresponding to the erroneous operation has been registered in the operator manual output table 62 (in steps C9). If the error code has been registered, the channel controller 16 memorizes a current entry number and counts up a corresponding error counter (in step C10). If a value of the error counter reaches more than allowable error number, the edit controller 23 produces and outputs an operational manual shown in FIGS. 10 and 11 (in steps C11 and C12). The operational manual is produced based on a corresponding help information address item 62c. Next, the channel controller 16 resets the value of the error counter to "0" to terminate the procedure (in step C13).

On the other hand, if the error code has not been registered in the operator manual output table 62 at the step U10, the channel controller 16 searches the corresponding help information item by means of the error code manual table 64 (in step U14). Then, the channel controller 16 writes down the help information address in the operator manual output table 62 (in step C15), and counts up the error counter (in step C16). If a value of the error counter reaches allowable error number, the edit controller 23 produces and outputs an operational manual (in steps C17 and C18). Next, the channel controller 16 resets the value of the error counter to "0" to terminate the procedure (in step C19). Lastly, the channel controller 16 add 1 to the current entry number (in step U21).

Thus, when the operator made an erroneous PB request, the facsimile mail system 1 automatically transmits the operational manual, so that the operator can successfully use a desired service function thereof. In addition, since the allowable error number is variable, the operational manual can be produced in accordance with the level of a skill of the operator. For example, the allowable error number established is relatively lower for a beginner than for an advanced operator.

A description will now be given of an operation of the facsimile mail system 1 by which the operational manual is automatically transmitted to an operator of a terminal, with reference to FIGS. 19 and 20. However, before the operation of the facsimile mail system 1 is explained, a description will now be given of a operator manual table searching table 70, an operator manual table 72 and a time-out manual table 74 which are to be stored in the data memory 19.

Figure 16:
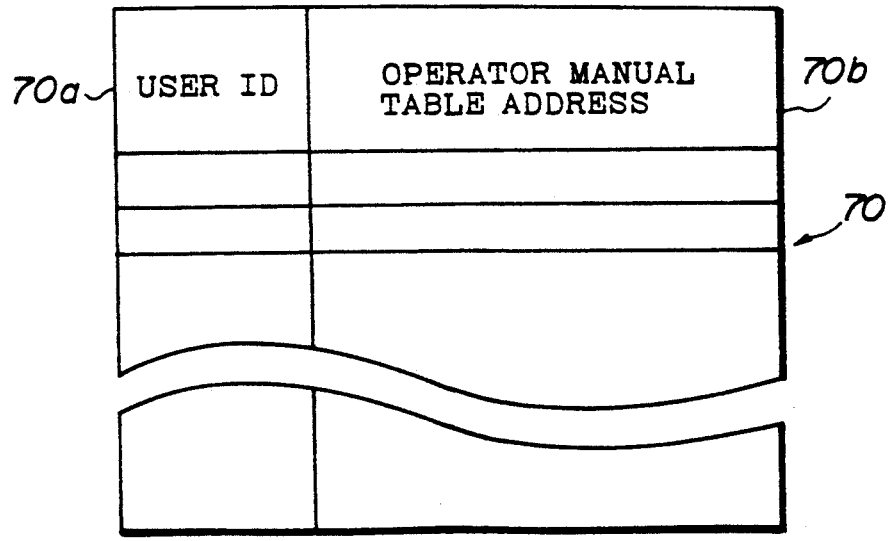
FIG. 16 shows an operator manual table searching table.

The operator manual table searching table 70 is, as shown in FIG. 16, used for searching the operator manual table 72. The operator manual searching table 70 comprises the items of a user ID 70a and an operator manual output table address 70b. Due to this table 70, if only a user ID is transmitted, the operator manual table 72 corresponding to the user ID can be searched.

The operator manual output table 72, prepared for every operator, comprises, as shown in FIG. 17, the items of a minimum procedure code 72a and a frequency in use 72b. The minimum procedure code 72a indicates a code of each minimum procedure. Therefore, all the minimum procedure have been listed in the table 72 in advance. The frequency in use 72b indicates a frequency in use of the corresponding minimum procedure. Incidentally, the number of the minimum procedure code items 72a may be limited.

The time-out manual table 74 comprises, as shown in FIG. 18, the items of a minimum procedure code 74a, help information address 74b and time-out period 74c. The minimum procedure code 74a corresponds to the minimum procedure code 72a, and a description thereof will be omitted. The help information address 74b corresponds to the help information address 62c shown in FIG. 13, and a description thereof will be omitted. The time-out period 74c indicates a necessary period within which it is necessary for the operator to operate a corresponding minimum procedure. Incidentally, only one time-out period 74c may be provided for all the minimum procedures.

Incidentally, the data memory 19 further stores an allowable error number and an error counter. However, as they respectively correspond to the allowable error 62e and error counter 62b shown in FIG. 13, a description thereof will be omitted. Incidentally, the channel controller 16 has a timer therein.

Figure 19:
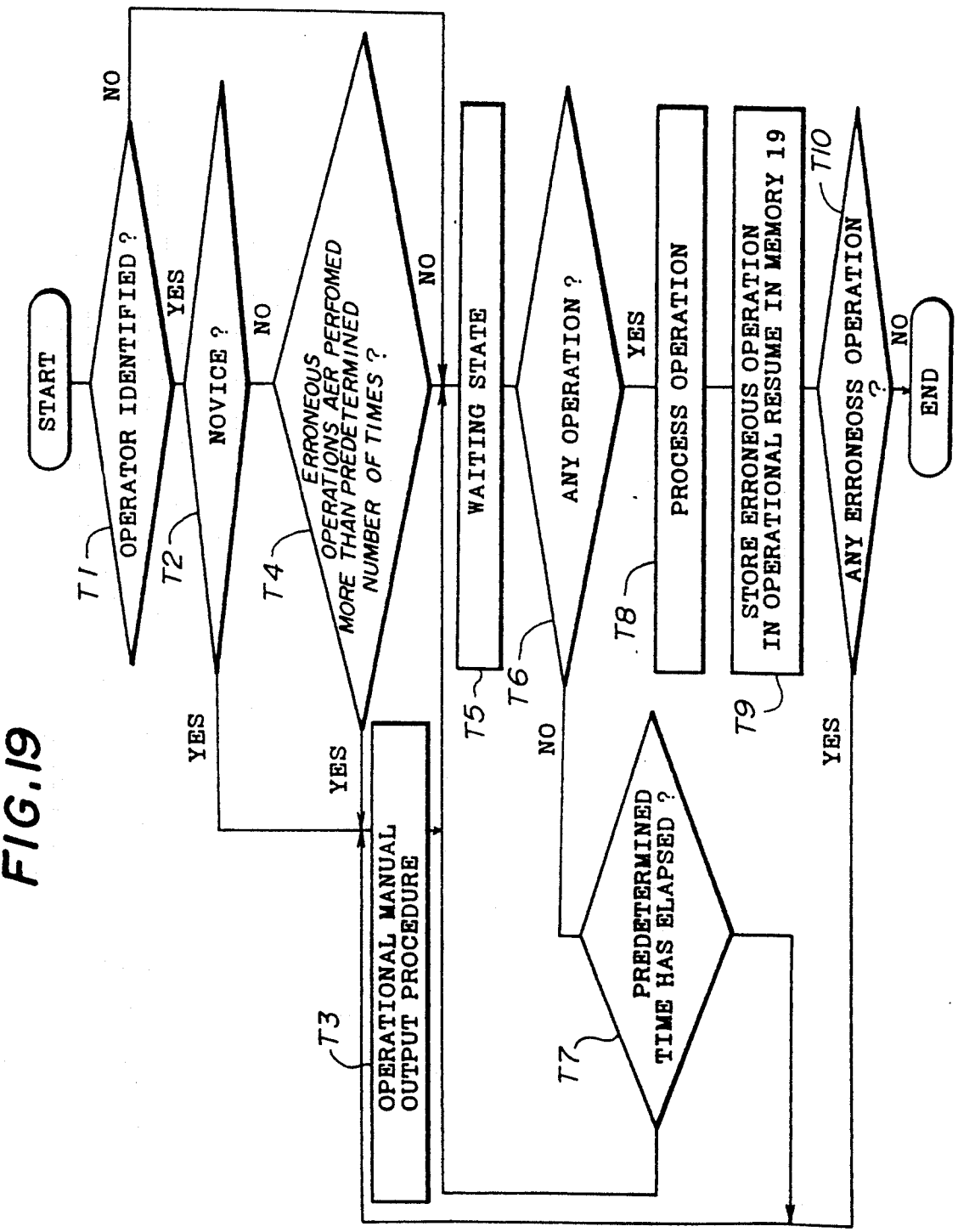
FIG. 19 shows one example of a flowchart executed by the facsimile mail system shown in FIG. 1 which automatically produces an operational manual.

As shown in FIG. 19, the channel controller 16 first judges whether the operator has been identified by means of the user ID (in step T1). If the operator has been identified, the channel controller 16 judges whether or not the operator is a novice as regards the use of this facsimile mail system 1 (in step T2) based on the operator manual table 72 If the frequency in use item 72b of a certain minimum procedure is zero, which indicates that the operator has not operated the minimum procedure, the channel controller 16 judges that the operator is a novice concerning the operation of the minimum procedure. When the operator is judged to be a novice, the edit controller 23 automatically produces an operational manual and outputs it to the operator (in step T3). However, if the operator is judged not to be a novice, the channel controller 16 judges whether the operator has erroneously operated the minimum procedure more than a predetermined number of times (in step T4) based on the error counter and the allowable error number. Needless to say, a value of the counter is reset for every step. If the operator has erroneously operated the minimum procedure more than the allowable error number, the edit controller 23 automatically produces an operational manual and outputs it thereto (in step T3). On the other hand, if the operator has not erroneously operated the minimum procedure more than the allowable error number, the communication controller 13 and the channel controller 16 wait for the operator to operate the next minimum procedure (in step T5). But if the operator does not operate the minimum procedure within a predetermined time-out period (in steps T6 and T7), the channel controller 16 regards the operator as a beginner and the edit controller 23 produces the operational manual and outputs it thereto based on the corresponding help information item address 74b in the time-out manual table 74 (in step T3). The channel controller 16 measures the time-out period by the timer therein and the time-out period item 74c on the time-out manual table 74. On the contrary, if the operator operates the minimum procedure within a predetermined time, the channel controller 16 analyzes and processes the operation (in step T8). Then, the channel controller 6 stores an erroneous operation performed by the operator correlatively with the operator described in the operational resume in the data memory 19 (in step T10). If the erroneous operation is present, the edit controller 23 produces the operational manual and outputs it to the operator (in steps T10 and T3). Incidentally, if the operator is not identified in the step T1, the procedure is transferred to the step T5.

Figure 20A:
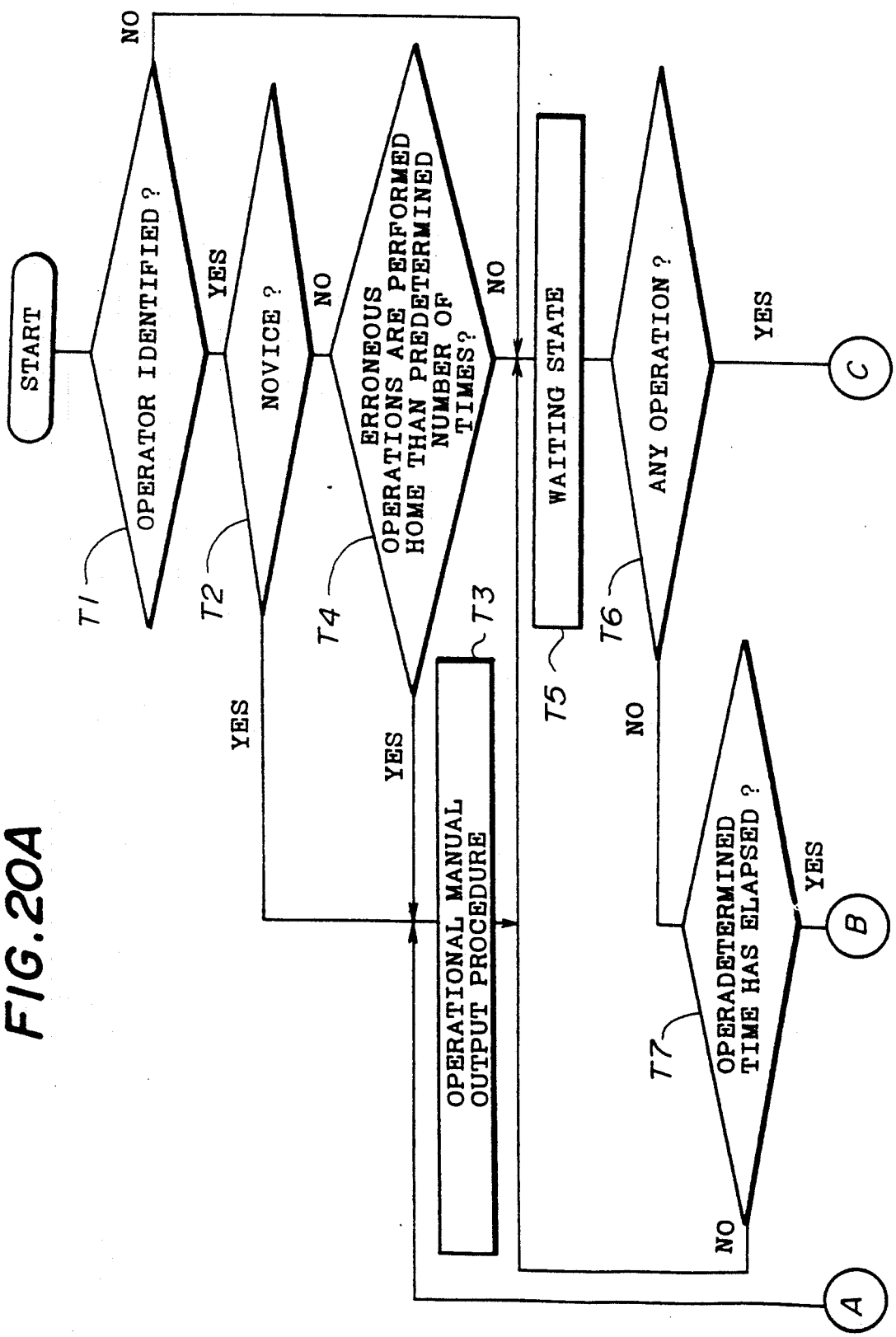

Moreover, as shown in FIG. 20, if the operator operates the next minimum procedure within a predetermined time at the step T7, the channel controller 16 may wait for the operator to request an operational manual (in step T11). As a result, if the operator requests the operational manual, the channel controller 16 grants the request (in steps T13 and T14), and then the edit controller 23 produces the operational manual and outputs it thereto (in step T3). However, if the operator does not request the operational manual within a given time-out period, the channel controller 16 regards the operator as a beginner and the edit controller 23 automatically produces the operational manual and outputs it thereto (in steps T12, T13 and T3). The channel controller 16 measures the time-out period by the timer therein and the time-out period item 74c. Thus, the operator can have a time sufficient for requesting the operational manual from the facsimile mail system 1. In addition, if the operator cannot manage the operation of the minimum procedures for requesting the operational manual, the operational manual is automatically produced, so that the skill of the operator can be improved. Incidentally, the above procedures shown in FIGS. 19 and 20 are applicable to the step S6 shown in FIG. 6C. That is, the above procedure can be applied to the OMR request.

Next, a description will now be given of the operation of the facsimile mail system 1 which supplies an error report to an operator. However, before explaining this operation, a description will now be given of various types of error formats stored in the hard disk drivers 6 and/or 7.

Each of the error formats informs the operator that he/she has erroneously operated a minimum procedure. An ID error format, a service code error format, a mail board error format, a mail box error format, a time error format, an address ID error format and a "#" error format are provided. For example, as for an ID error format, as shown in FIG. 21A, an ID code that the operator has entered is inserted into a blank space thereon. Thus, the operator can logically correct the wrong ID code and then reenter this corrected code. Incidentally, the data memory 19 temporarily memorizes an erroneous operation, as described below.

Figure 22:
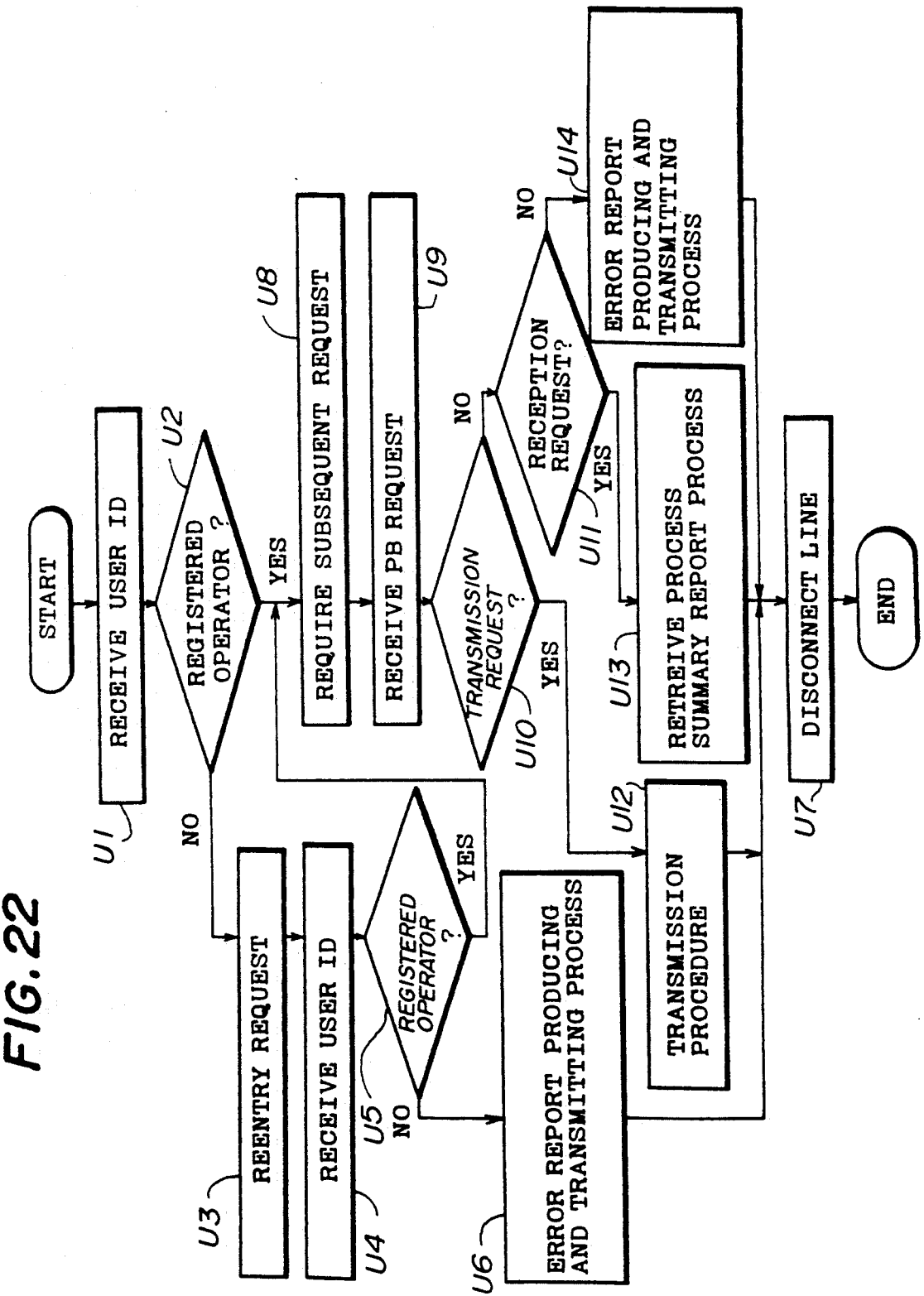
FIG. 22 shows a flowchart executed by the facsimile mail system shown in FIG. 1 which produces and transmits an error report to the terminal.

As shown in FIG. 22, after the communication controller 13 receives a user ID (in step U1), the channel controller 16 judges whether or not the user ID has been registered in the system information memory 22 (in step U2). If the user ID has not been registered, the channel controller 16 requests the operator to reenter a user ID (in step U3). Accordingly, after the communication controller 13 receives another user ID (in step U4), the channel controller 16 judges whether or not the other user ID has been registered (in step U5). Nevertheless, if the new user ID has not been registered, the data memory 19 memorizes the reentered user ID and recognizes it as an ID error. Then the edit controller 23 produces an error report shown in FIG. 21B by reading out an ID error format from the hard disk drivers 6 and/or 7. Lastly, the communication controller 13 disconnects a corresponding communication line to terminate the procedure (in steps U6 and U7).

On the other hand, if the received user ID has been registered at the step U2, the channel controller 16 requires a subsequent request the terminal (in step U8). If the channel controller 16 receives a PB request (in step U9), it judges whether the operator is requesting a mail transmission or a mail reception (in steps U10 and U11). If the operator is requesting the mail transmission, the edit controller 23 supplies an operational manual to the operator based on an address ID of the terminal and a kind of the mail transmission (in step U12). After the mail transmission, the communication controller 13 disconnects the corresponding communication line (in Step U7). Incidentally, if the PB request includes an error, the channel controller 16 produces an error report by reading out the error format from the hard disk drivers 6 and/or 7.

On the other hand, if the operator requests the mail reception, the channel controller 16 performs a retrieve process or a summary report process. Hereupon, the term "a retrieve process", as used herein, means that the facsimile mail system 1 receives a same piece of mail which is the same as that which the facsimile mail system has already once received. The facsimile mail system 1 performs the retrieve process by entering the code of the mail, which is generally indicated in the vicinity of the header of the mail. In addition, the term "a summary report", as used herein, means a process to inform an operator of the result of the request which has been made by the operator. After the step U13, the communication controller 13 disconnects the communication line (in step U7). If the operator also does not request a mail reception, the edit controller 23 produces an error report by reading out an ID error format from the hard disk drivers 6 and/or 7 and then the communication controller 13 disconnects the communication line (in steps U14 and U7). Moreover, if the operator has not request the retrieve process or the operator has erroneously requested the retrieve process, the facsimile mail system 1 transmits the error report thereto (in steps U14 and U7).

Incidentally, if the operator has entered a wrong user ID, it may be necessary to require the operator to enter his/her telephone number by voice before the communication controller 13 disconnects the communication line.

Next, a detailed description will be given of the steps U6 and U14 shown in FIG. 22. Incidentally, the system information memory 22 has a plurality of counters. The number of the counters corresponds to that of the error formats. The channel controller 16 examines each value of each counter in the system information memory 22. Each counter in the system information memory 22 counts the error number regarding a minimum operation entered by the operator for every terminal. Each counter has an allowable error number. The edit controller 23 produces an error report if a value of each counter reaches its allowable error number.

Figure 23:
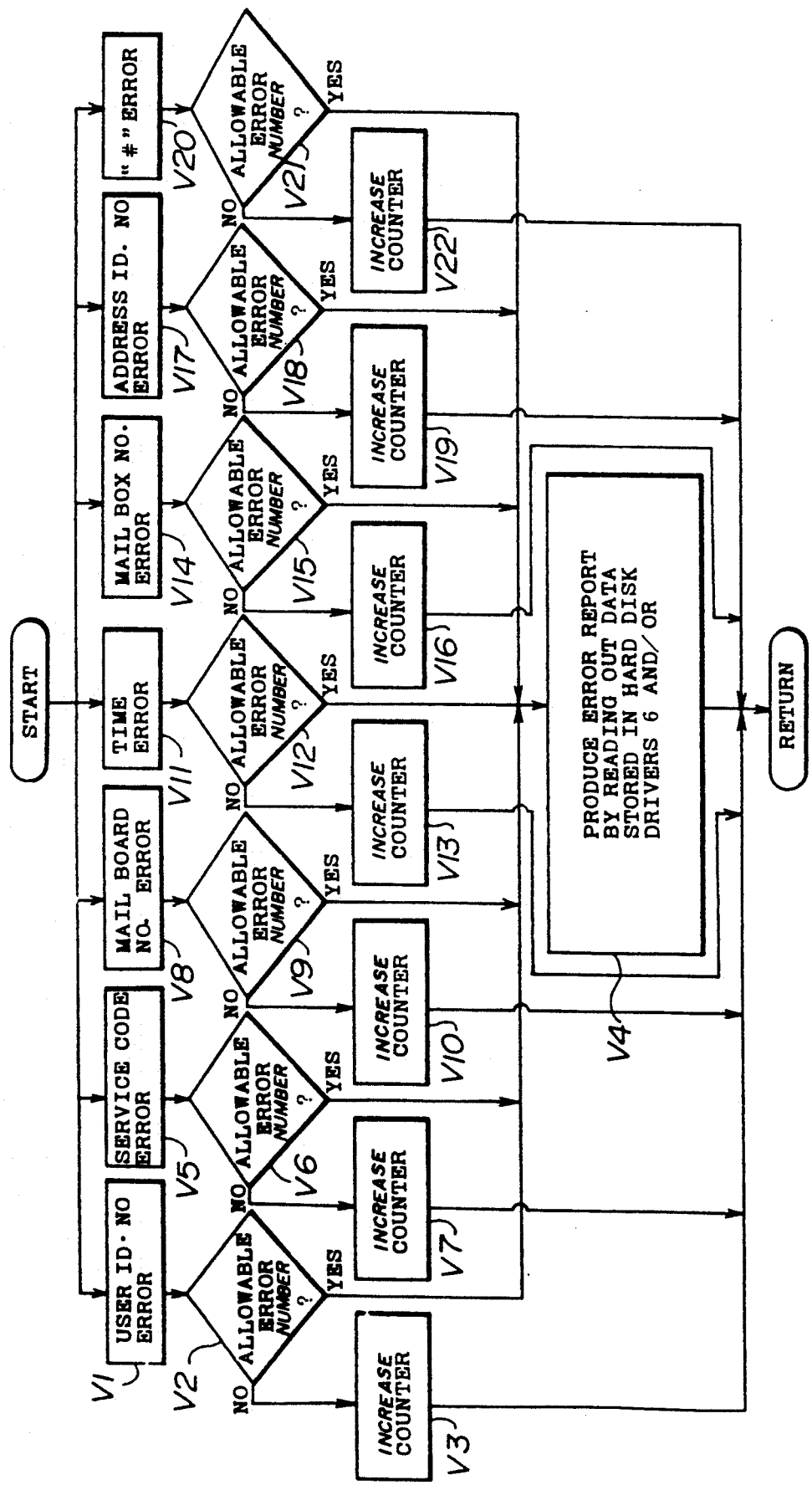
FIG. 23 shows one example of a part of flowchart shown in FIG. 22 which is indicated in detail.

As shown in FIG. 23, if a user ID includes an error (in step V1), the channel controller 16 judges whether or not a value of the counter reaches its allowable error number (in step V2). If the value of the counter does not reach the allowable error number, the channel controller 16 increases the counter (in step V3). However, if the value of the counter reaches the allowable error number, the edit controller 23 produces an error report about the user ID by reading out a user ID error format stored in the hard disk drivers 6 and/or 7 (in step V4).

If a service code is judged to be an error (in step V5), the channel controller 16 judges whether or not a value of the counter reaches its allowable error number (in step V6). If the value of the counter does not reach the allowable error number, the channel controller 16 increases the value of the counter (in step V7). However, if the value of the counter reaches the allowable error number, the edit controller 23 produces an error report about the service code by reading out a service code error format stored in the hard disk drivers 6 and/or 7 (in step V4).

If a mail board number includes an error (in step V8), the channel controller 16 judges whether or not a value of the counter reaches its allowable error number (in step V9). If the value of the counter does not reach the allowable error number, the channel controller 16 increases the counter (in step V10). However, if the value of the counter reaches the allowable error number, the edit controller 23 produces an error report about the mail board by reading out a mail board error format stored in the hard disk drivers 6 and/or 7 (in step V4).

If a designated time includes an error (in step V11), the channel controller 16 judges whether or not a value of the counter reaches its allowable error number (in step V12). If the value of the counter does not reach the allowable error number, the channel controller 16 increases the counter (in step V13). However, if the value of the counter reaches the allowable error number, the edit controller 23 produces an error report about the time designation by reading out a time error format stored in the hard disk drivers 6 and/or 7 (in step V4).

If a mail box number includes an error (in step V14), the channel controller 16 judges whether or not a value of the counter reaches its allowable error number (in step V15). If the value of the counter does not reach the allowable error number, the channel controller 16 increases the counter (in step V16). However, if the value of the counter reaches the allowable error number, the edit controller 23 produces an error report about the mail box by reading out a mail box error format stored in the hard disk drivers 6 and/or 7 (in step V4).

If an address ID number includes an error (in step V17), the channel controller 16 judges whether or not a value of the counter reaches its allowable error number (in step V18). If the value of the counter does not reach the allowable error number, the channel controller 16 increases the value of the counter (in step V19). However, if the value of the counter reaches the allowable error number, the edit controller 23 produces an error report about the address ID by reading out an address ID error format stored in the hard disk drivers 6 and/or 7 (in step V4).

If a "#" includes an error (in step V20), the channel controller 16 judges whether or not a value of the counter reaches its allowable error number (in step V21). If the value of the counter does not reach the allowable error number, the channel controller 16 increases the value of the counter (in step V22). However, if the value of the counter reaches the allowable error number, the edit controller 23 produces an error report about the "#" by reading out a "#" error format stored in the hard disk drivers 6 and/or 7 (in step V4).

As mentioned above, since the facsimile mail system 1 examines a value of each counter and judges whether or not the value thereof reaches an allowable error number, each operator can easily correct the error which he/she has entered.

Another detailed description will now be given of the steps U6 and U14 shown in FIG. 22.

Figure 24:
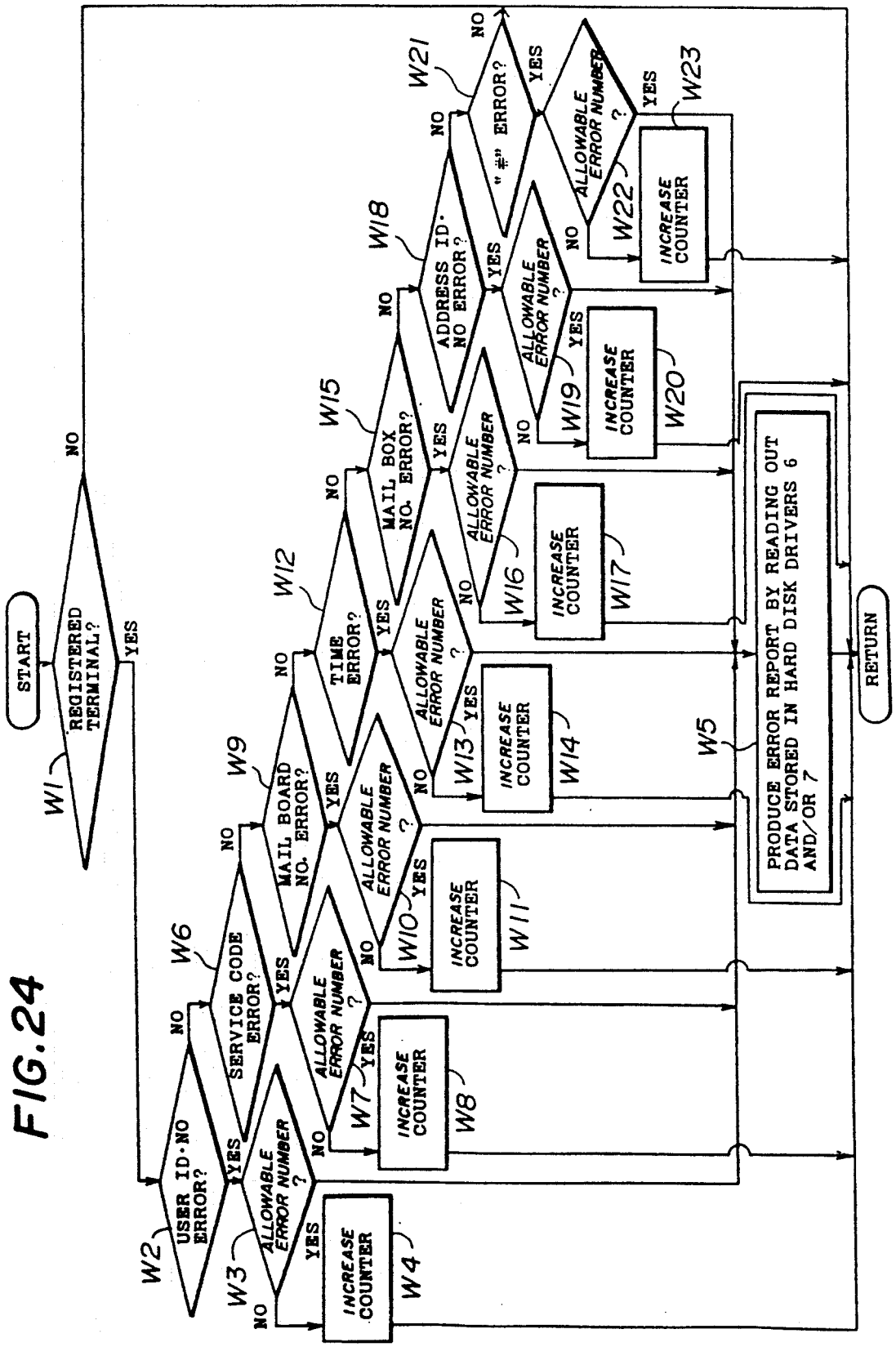
FIG. 24 shows another example of a part of a flowchart shown in FIG. 22 which is indicated in detail.

As shown in FIG. 24, the channel controller 16 judges whether or not the terminal is registered (in step W1). If the terminal has been registered, the channel controller 16 judges whether or not the user ID includes an error (in step W2). If the user ID includes an error, the channel controller 16 judges whether or not a value of the counter reaches its allowable error number (in step W3). If the value of the counter does not reach the allowable error number, the channel controller 16 increases the value of the counter (in step W4). However, if the value of the counter reaches the allowable error number, the edit controller 23 produces an error report about the user ID by reading out a user ID error format stored in the hard disk drivers 6 and/or 7 (in step W5). Incidentally, the edit controller 23 may produce an outputs an error report shown in FIG. 25.

However, if a service code includes an error (in step W6), the channel controller 16 judges whether or not a value of the counter reaches its allowable error number (in step W7). If the value of the counter does not reach the allowable error number, the channel controller 16 increases the counter (in step W8). However, if the value of the counter reaches the allowable error number, the edit controller 23 produces an error report about the service code by reading out a service code error format stored in the hard disk drivers 6 and/or 7 (in step W5).

However, if a mail board number includes an error (in step W9), the channel controller 16 judges whether or not a value of the counter reaches its allowable error number (in step W10). If the value of the counter does not reach the allowable error number, the channel controller 16 increases the value of the counter (in step W11). However, if the value of the counter reaches the allowable error number, the edit controller 23 produces an error report about the mail board by reading out a mail board error format stored in the hard disk drivers 6 and/or 7 (in step W5).

However, if a designated time includes an error (in step W12), the channel controller 16 judges whether or not a value of the counter reaches its allowable error number (in step W13). If the value of the counter does not reach the allowable error number, the channel controller 16 increases the value of the counter (in step W14). However, if the value of the counter reaches the allowable error number, the edit controller 23 produces an error report about the time designation by reading out a time error format stored in the hard disk drivers 6 and/or 7 (in step W5).

However, if a mail box number includes an error (in step W15), the channel controller 16 judges whether or not a value of the counter reaches its allowable error number (in step W16). If the value of the counter does not reach the allowable error number, the channel controller 16 increases the value of the counter (in step W17). However, if the value of the counter reaches the allowable error number, the edit controller 23 produces an error report about the mail box by reading out a mail box error format stored in the hard disk drivers 6 and/or 7 (in step W5).

However, if an address ID number includes an error (in step W18), the channel controller 16 judges whether or not a value of the counter reaches its allowable error number (in step W19). If the value of the counter does not reach the allowable error number, the channel controller 16 increases the value of the counter (in step W20). However, if the value of the counter reaches the allowable error number, the edit controller 23 produces an error report about the address ID by reading out an address ID error format stored in the hard disk drivers 6 and/or 7 (in step W5).

However, if a "#" includes an error (in step W21), the channel controller 16 judges whether or not a value of the counter reaches its allowable error number (in step W22). If the value of the counter does not reach the allowable error number, the channel controller 16 increases the value of the counter (in step W23). However, if the value of the counter reaches the allowable error number, the edit controller 23 produces an error report about the "#" by reading out a "#" error format stored in the hard disk drivers 6 and/or 7 (in step W5).

Even in this embodiment, since the facsimile mail system 1 examines a value of each counter and judges whether or not the value thereof reaches an allowable error number, each operator can easily correct the error which he/she has entered.

Further, the present invention is not limited to these embodiments, and variations and modifications may be made without departing from the scope of the present invention.

What is claimed is:

1. An apparatus for use with a machine, the apparatus for outputting an operational manual to an operator of the machine, the operational manual teaching the operator how to operate the machine according to a number of different minimum procedures in order to accomplish one of the functions with which the machine is equipped, each of the functions comprising a plurality of the minimum procedures where each of the procedures is in its simplest form, said apparatus comprising:

first memory means for storing a help information item for every minimum procedure, each help information item indicating to the operator how to operate the machine according to a corresponding procedure;

second memory means for storing operations which are input by the operator;

detecting means, coupled to said second memory means, for analyzing the operations stored in said second memory means and for detecting a predetermined function desired by the operator;

edit means, coupled to said first memory means and said detecting means, for producing the operational manual containing help information items corresponding to the predetermined function, said predetermined function consisting of a plurality of said minimum procedures, said help information items arranged in a desired sequence based on the analysis of the operations stored in said second memory means and for supplying in perceivable form the operational manual to the operator; and edit control means, coupled to said edit means, for determining whether or not a predetermined condition has been established and for instructing said edit means to produce and supply the operational manual to the operator if said edit control means determines that the predetermined condition has been established.

2. An apparatus according to claim 1, wherein said edit control means instructs said edit means to produce the operational manual and supply the same to the operator of said control means judges that the operator has not operated the machine according to a minimum procedure, which is part of the predetermined function, within a predetermined period of time.

3. An apparatus according to claim 2, wherein said edit control means instructs said edit means to immediately start producing the operational manual when said control means judges that the operator has not operated the machine according to the minimum procedure within the predetermined period of time.

4. An apparatus according to claim 2, wherein said edit control means instructs said edit means to start producing the operational manual a predetermined time after said edit control means has judged that the operator has not operated the machine according to the minimum procedure within the predetermined period of time.

5. An apparatus according to claim 4, wherein said edit control means instructs said edit means to produce the operational manual and supply the same to the operator if the operator requests said apparatus for the operational manual before the predetermined time has passed.

6. An apparatus according to claim 2, wherein said edit control means comprises:

timer means for measuring how long it takes for the operator to operate the machine according to the minimum procedure; and first comparing means, coupled to the timer means, for comparing a period measured by the timer means with an allowable time period which has been predetermined.

7. An apparatus according to claim 1, wherein said edit control means produces the operational manual corresponding to a part of the predetermined function which has not been accomplished by the operator.

8. An apparatus according to claim 1, wherein said edit means produces the operational manual including all the help information items of the minimum procedures constituting the predetermined function.

9. An apparatus according to claim 1, wherein said edit means produces the operational manual by minimum procedure constituting the predetermined function.

10. An apparatus according to claim 1, wherein said edit means produces the operational manual by combining the help information items for every minimum procedure of the predetermined function and arranging the help information items in a desired order of operation.

11. An apparatus according to claim 1, wherein, if said control means judges that the operator has never operated the machine according to any minimum procedure, said edit control means instructs said edit means to produce the operational manual concerning the predetermined minimum procedure and supply the same to the operator.

12. An apparatus according to claim 11, wherein said edit control means comprises a table showing a relationship between various kinds of minimum procedures and how many times the operator has already operated each minimum procedure, and said edit control means judges whether or not the operator has not yet operated any minimum procedure by means of the table.

13. An apparatus according to claim 1, wherein said edit control means instructs said edit means to produce the operational manual and supply the same to the operator if said control means judges that the operator has operated the machine by not carrying out a predetermined minimum procedure more than a predetermined number of times.

14. An apparatus according to claim 13, wherein said edit control means comprises:

counter means for counting how many times the operator has erroneously operated each minimum procedure in the machine; and second comparing means, coupled to the counter means, for comparing a value counted by the counter means with an allowable error number which has been predetermined.

15. An apparatus according to claim 1, wherein said apparatus is operatively coupled to the machine.

16. An apparatus according to claim 15, wherein said machine comprises a facsimile mail system.

17. An apparatus according to claim 1, wherein said apparatus is connected with a telephone line, and wherein said apparatus further comprises first processing means for processing a push button tone signal, and said operator operates the machine according to a minimum procedure by means of the push button tone signal.

18. An apparatus according to claim 1, wherein said apparatus further comprises second processing means for processing a mark sheet, the operator operating the machine according to a minimum procedure by means of the mark sheet.

19. An apparatus according to claim 1, wherein said perceivable form is eye-readable form.

20. An apparatus for use with a machine, the apparatus for outputting an operational manual to an operator of the machine, the operational manual teaching the operator how to operate the machine according to a number of different minimum procedures in order to accomplish one of the functions with which the machine is equipped, each of the functions comprising a plurality of the minimum procedures where each of the procedures is in its simplest form, said apparatus comprising:
- first memory means for storing a help information item for every minimum procedure, each help information item indicating to the operator how to operate the machine according with a corresponding minimum procedure;
- second memory means for storing erroneous operations which are input by the operator;
- judging means, coupled to said second memory means, for judging whether or not the operator has made an erroneous operation more than a predetermined number of times; and
- edit means, coupled to said first memory means and judging means, for producing the operational manual containing a help information item for a minimum procedure erroneously operated by the operator if said judging means has judged the erroneous operation has been made more than a predetermined number of times, and for supplying a perceivable form the operational manual to the operator.

21. An apparatus according to claim 20, wherein said judging means comprises:
- counter means for counting for counting how many times the operator has erroneously operated each minimum procedure; and
- comparing means, coupled to the counter means, for comparing a value conuted by the counter means with an allowable error number which has been predetermined.

22. An apparatus according to claim 20, wherein said apparatus is operatively coupled to the machine.

23. An apparatus according to claim 22, wherein said machine comprises a facsimile mail system.

24. An apparatus according to claim 20, wherein said apparatus is connected with a telephone line, and
wherein said apparatus further comprises first processing means for processing a push button tone signal, the operator operating the machine according to a minimum procedure by means of the push button signal.

25. An apparatus according to claim 20, wherein said apparatus further comprises second processing means for processing a mark sheet, the operator operating the machine according to a minimum procedure by means of the mark sheet.

26. An apparatus according to claim 20, wherein said edit means produces the operational manual by combining help information items for every minimum procedure of the predetermined function.

27. An apparatus according to claim 20, wherein said edit means produces the operational manual by combining help information items for every minimum procedure of the predetermined function and arranging the help information items in a desired order of operation.

28. An apparatus according to claim 20, wherein said perceivable form is eye-readable form.

29. An apparatus for producing an operational manual of a certain machine and supplying the same to an operator of the machine, the operational manual teaching how to operate the machine according to a number of different minimum procedures in order to accomplish one of the functions with which the machine is equipped, each of the functions comprising the plurality of minimum procedures which can no longer be segmented, and said apparatus being coupled to the machine, said apparatus comprising:
- first memory means for storing a help information item for every minimum procedure, each help information indicating to the operator how to operate the machine according to a corresponding minimum procedure;
- second memory means for storing operations which are input by the operator;
- detecting means, coupled to said second memory means, for analyzing the operations stored in said second memory means, for detecting an erroneous operation from among the operations stored in said second memory means, and for detecting a predetermined function desired by the operator;
- first edit means, coupled to said first memory means and detecting means, for producing an operational manual containing help information items corresponding to the predetermined function, said predetermined function consisting of a plurality of said minimum procedures, said help information items arranged in a desired sequence based on the analysis of the operations stored in said second memory and for supplying the operational manual to the operator; and
- second edit means, coupled to said detecting means, for producing an error report indicating the erroneous operation detected by the detecting means and for supplying the error report whenever the operator makes an erroneous operation.

30. An apparatus according to claim 29, wherein said second edit means produces the error report appropriate to a particular kind of erroneous operation.

31. An apparatus according to claim 29, wherein said apparatus further comprises judging means for judging whether or not the operator has been identified by said apparatus, and
wherein said second edit means produces the error report and supplied the same to the operator if the operator has been identified by said judging means.

32. An apparatus according to claim 28, wherein said apparatus is operatively coupled to the machine.

33. An apparatus according to claim 32, wherein said machine comprises a facsimile mail system.

34. An apparatus according to claim 29, wherein said apparatus is connected with a telephone line, and
wherein said apparatus further comprises first processing means for processing a push button tone signal, the operator operating the machine according to a minimum procedure by means of the push button tone signal.

35. An apparatus according to claim 29, wherein said apparatus further comprises second processing means for processing a mark sheet, the operator operating the machine according to a minimum procedure by means of the mark sheet.

36. An apparatus according to claim 29, wherein said first edit means produces the operational manual by combining help information items for every minimum procedure of the predetermined function.

37. An apparatus according to claim 29, wherein said first edit means produces the operational manual by combining help information items for every minimum procedure of the predetermined function and arranging the help information items in a desired order of operation.

* * * * *